Jan. 26, 1960 M. P. MATTHEW 2,922,574
CALCULATING MACHINE
Filed Feb. 19, 1958 14 Sheets-Sheet 8
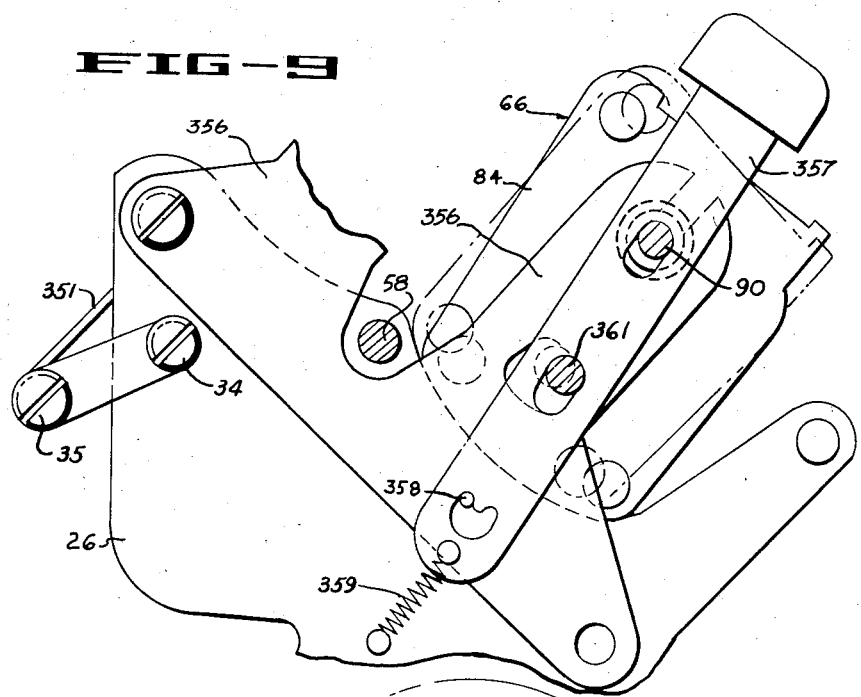
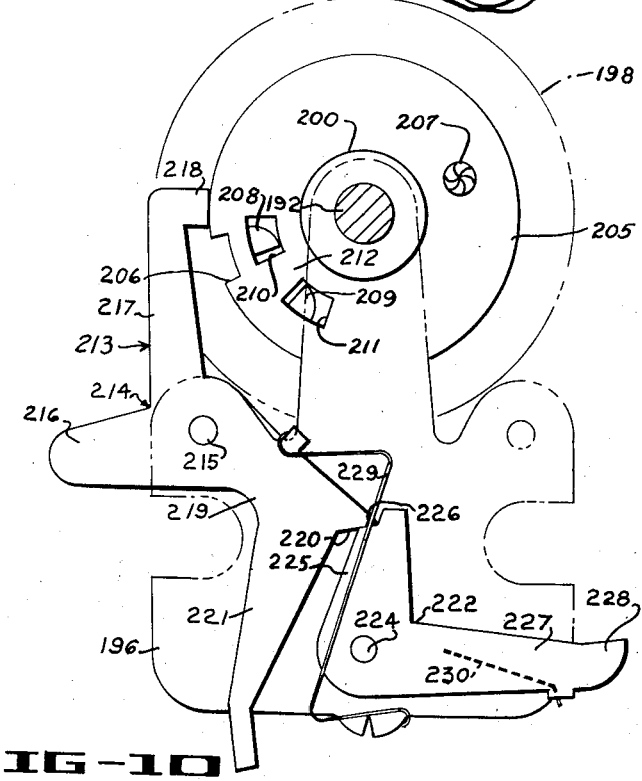

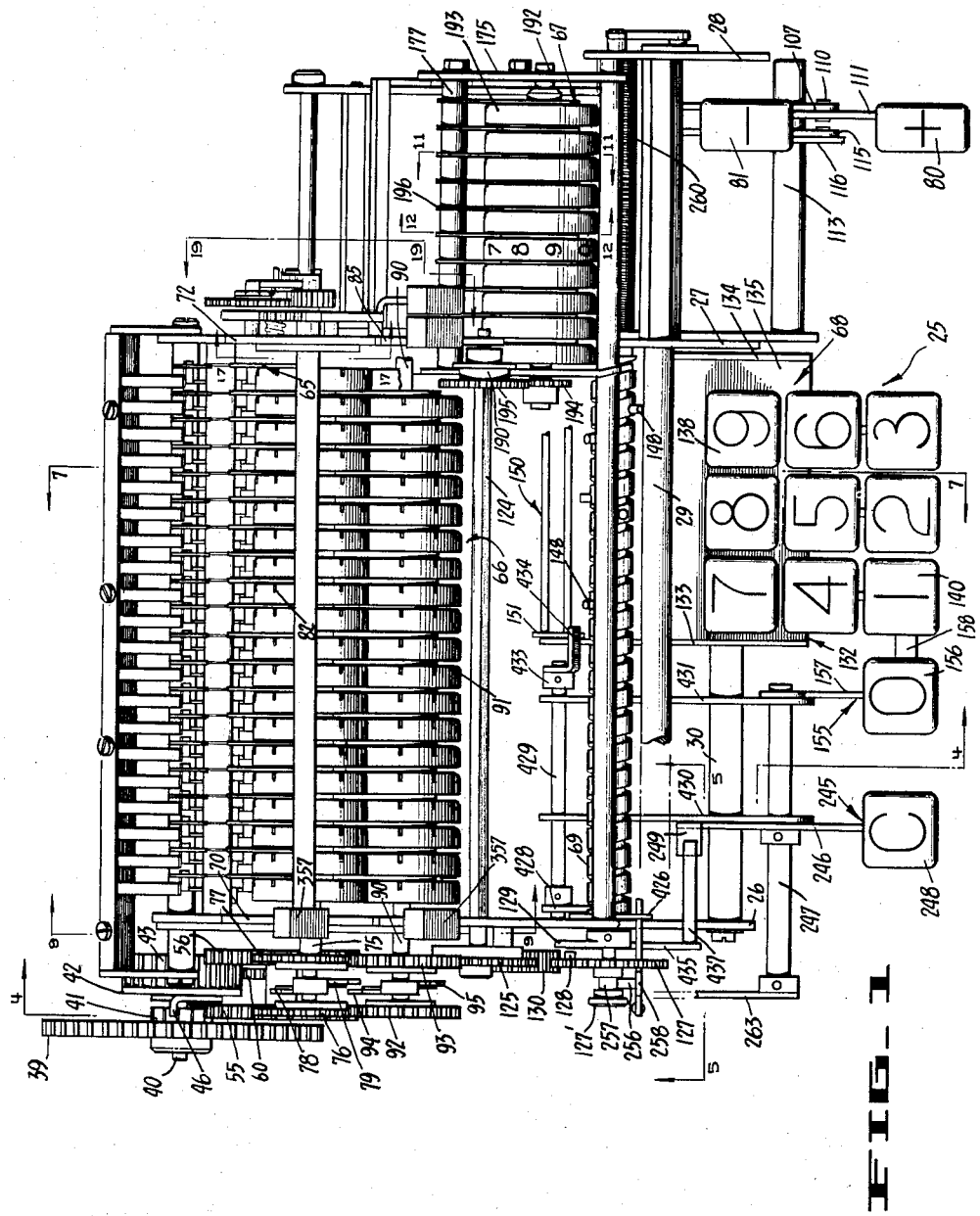

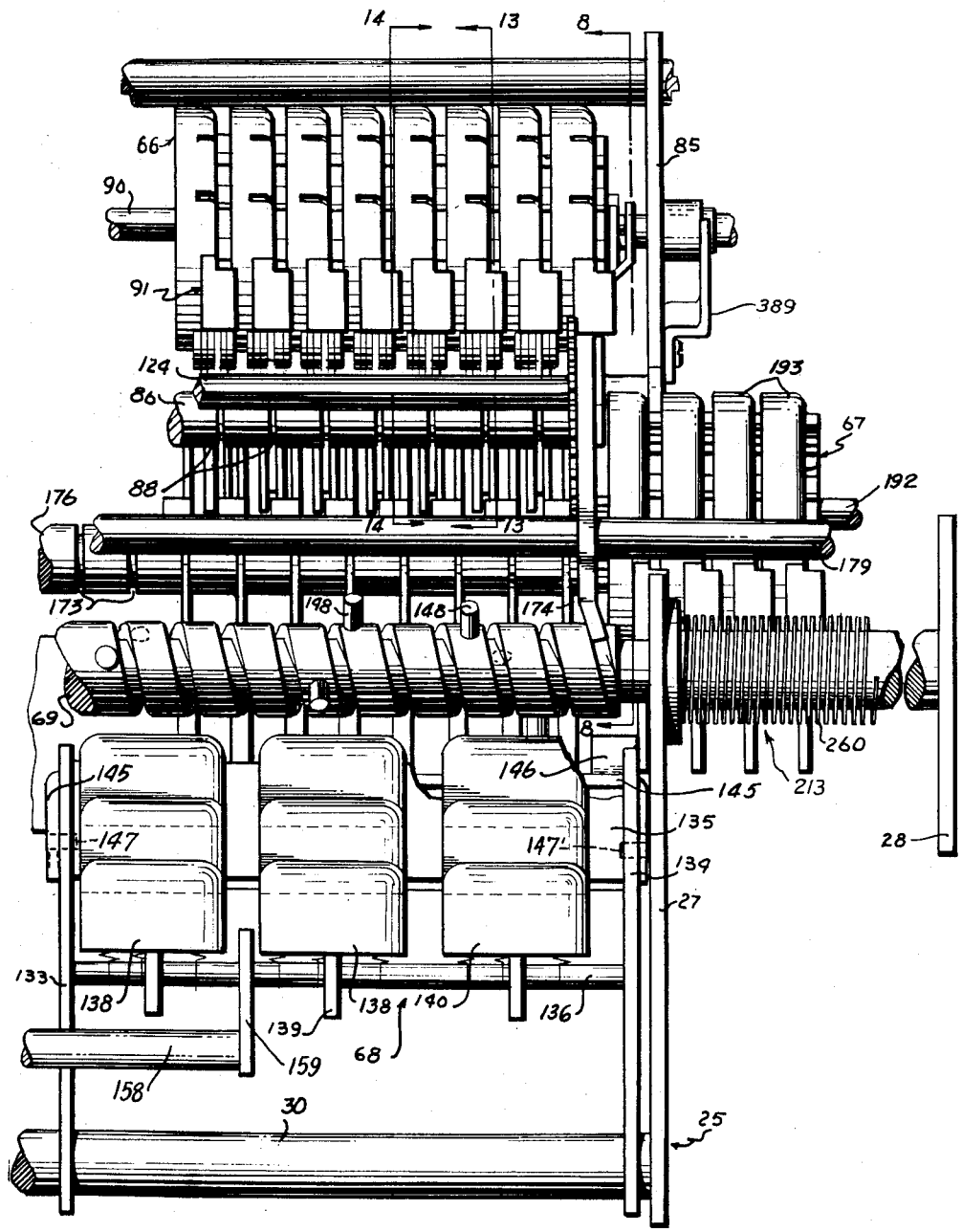
FIG_2

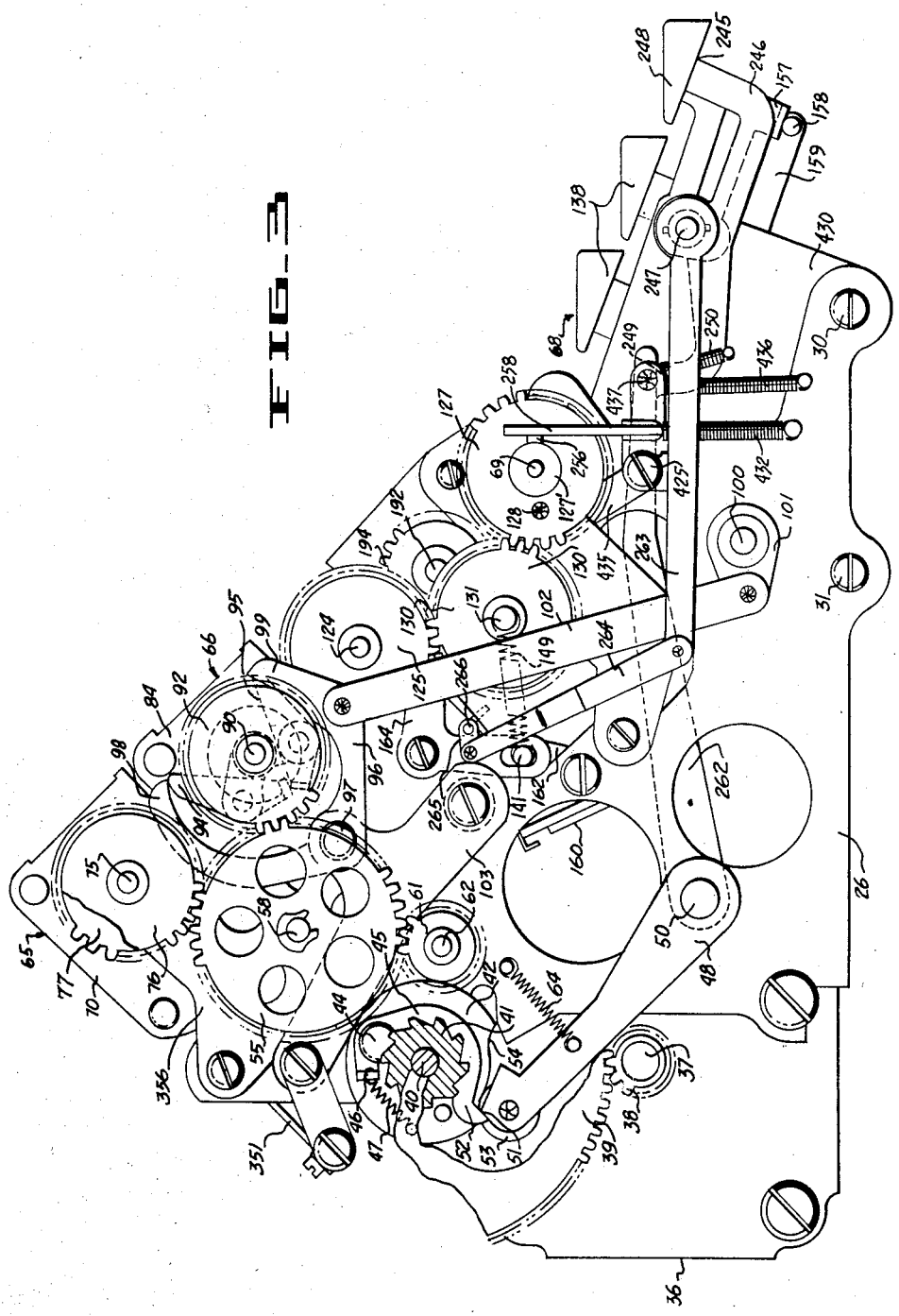

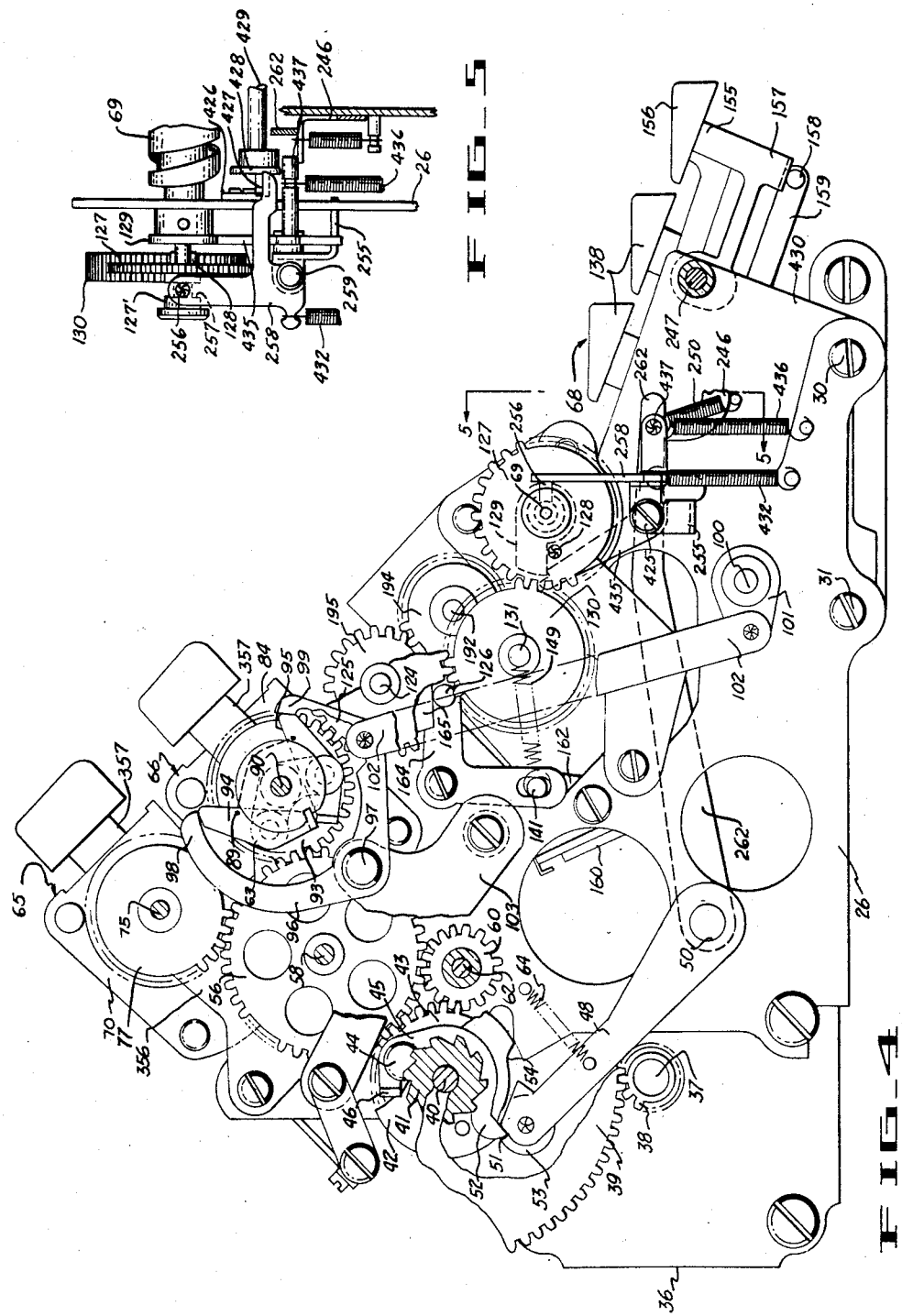

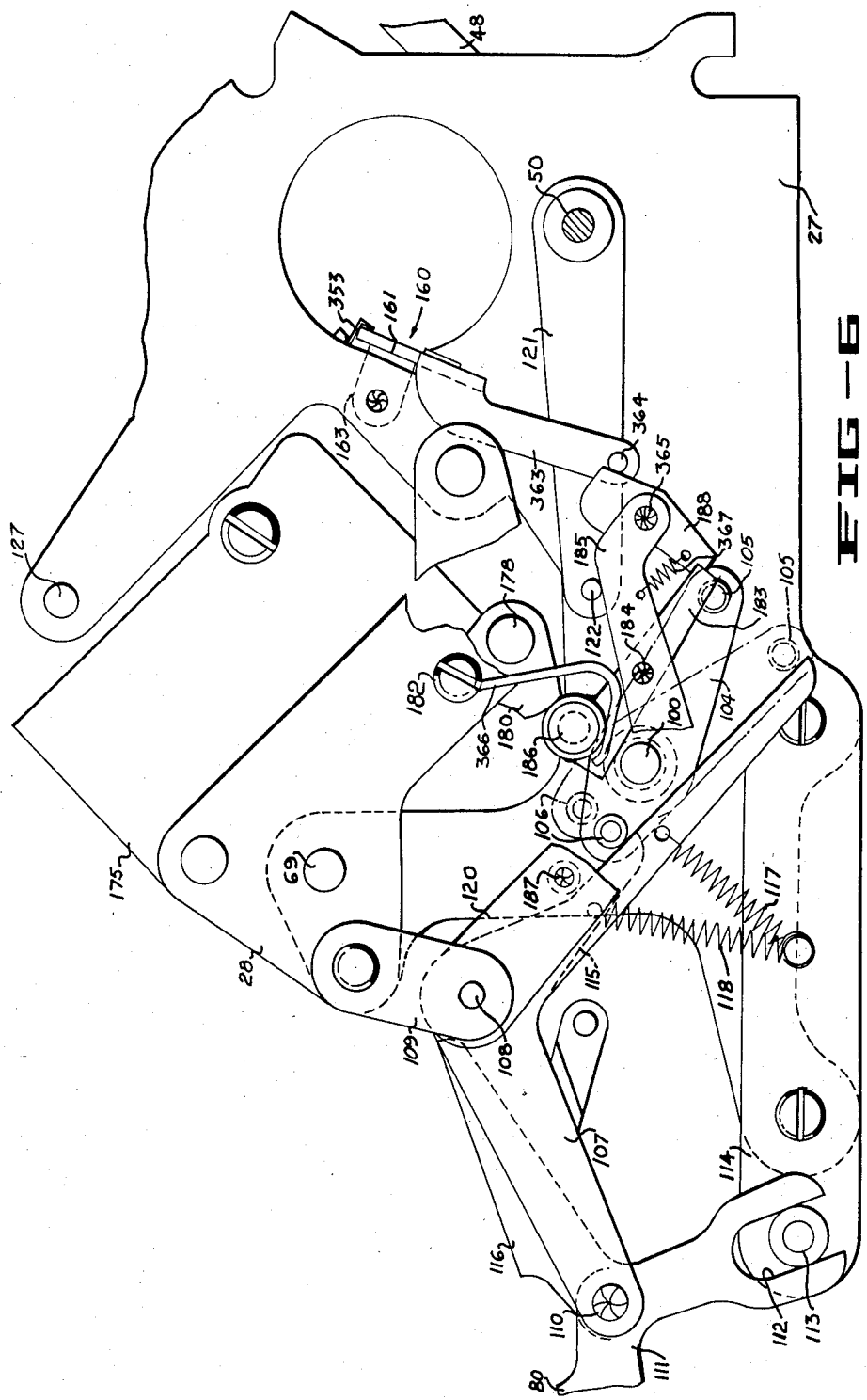

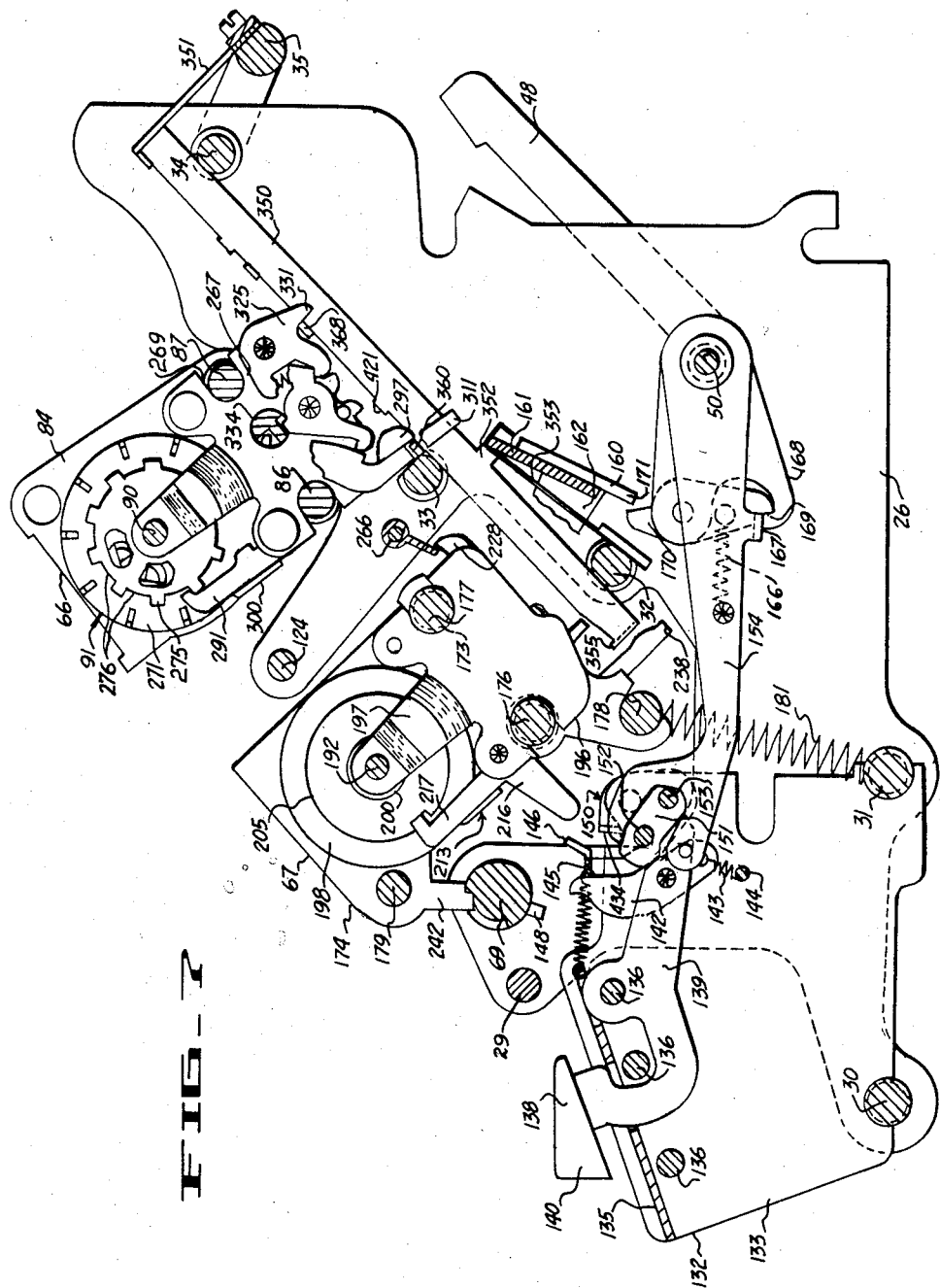

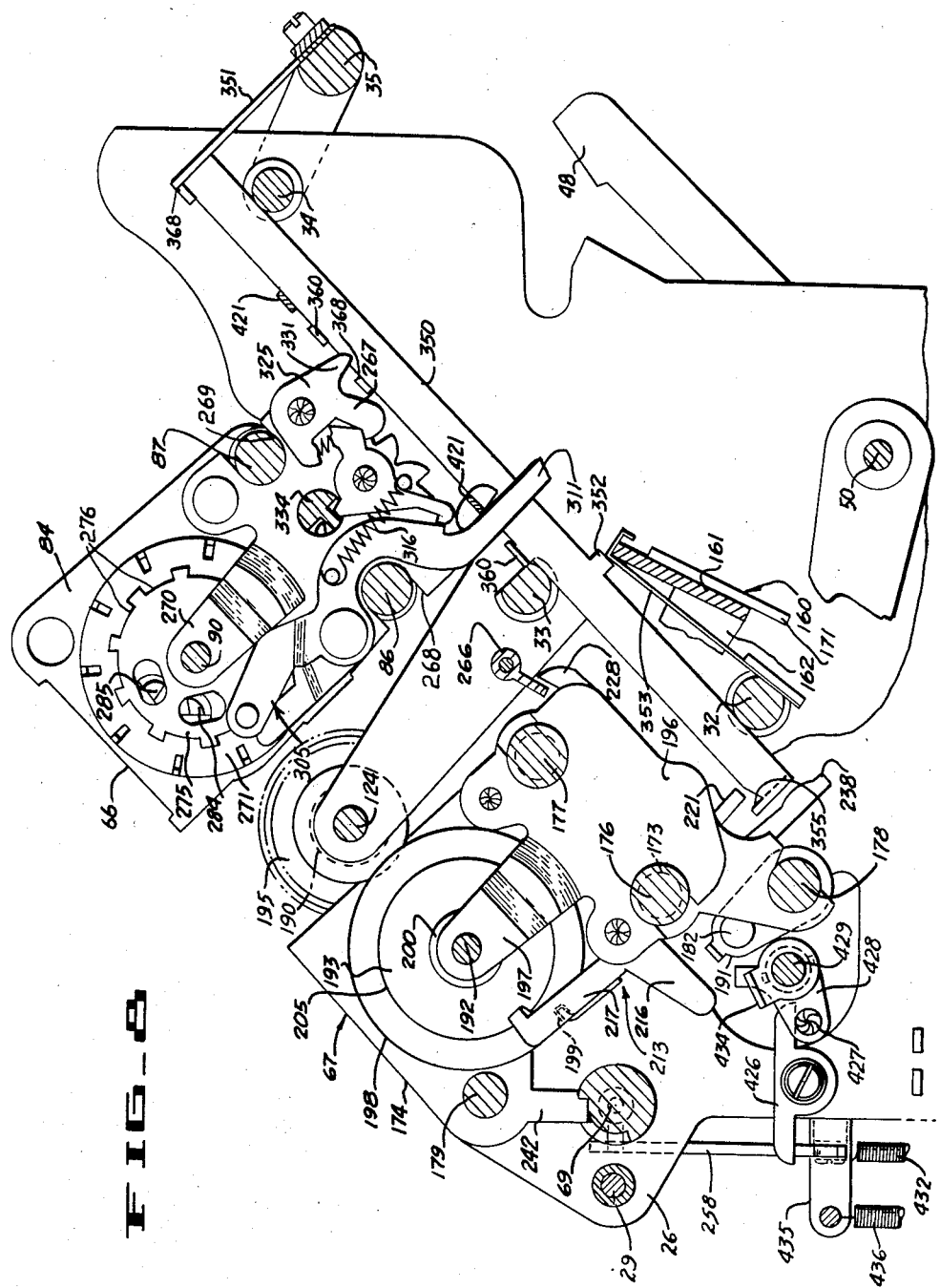

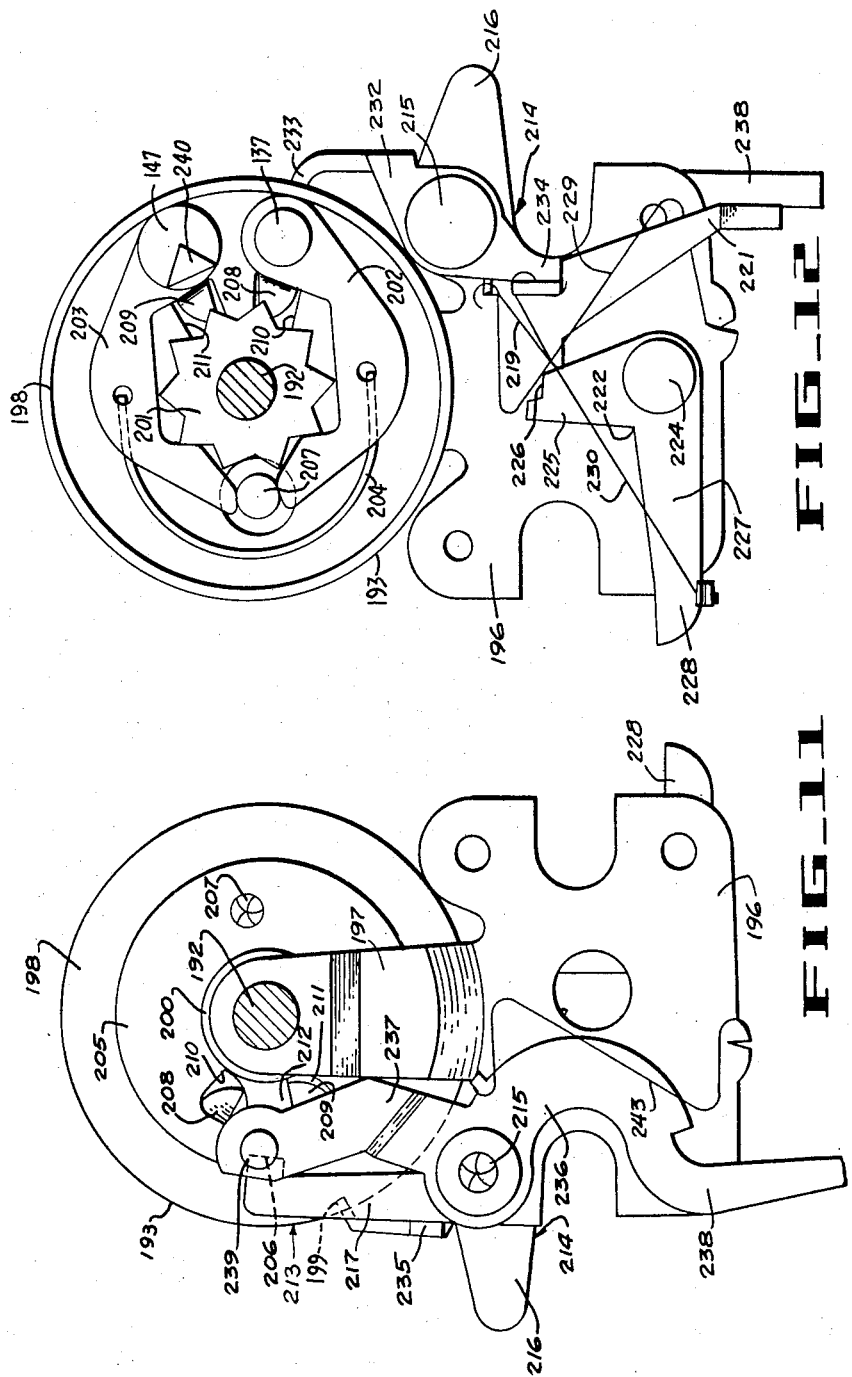

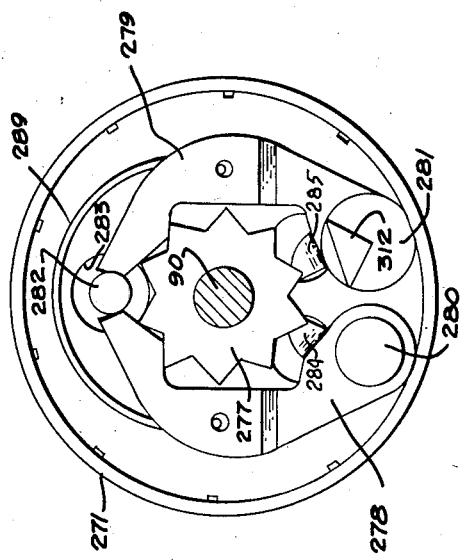
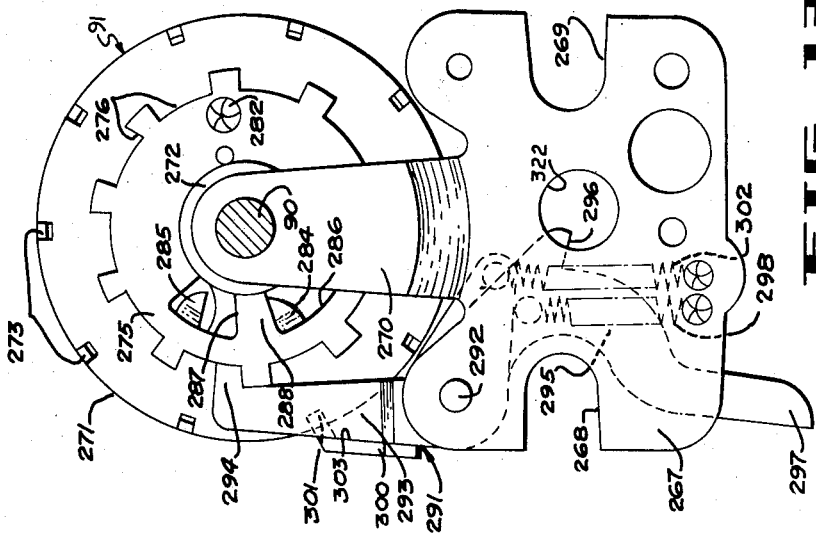

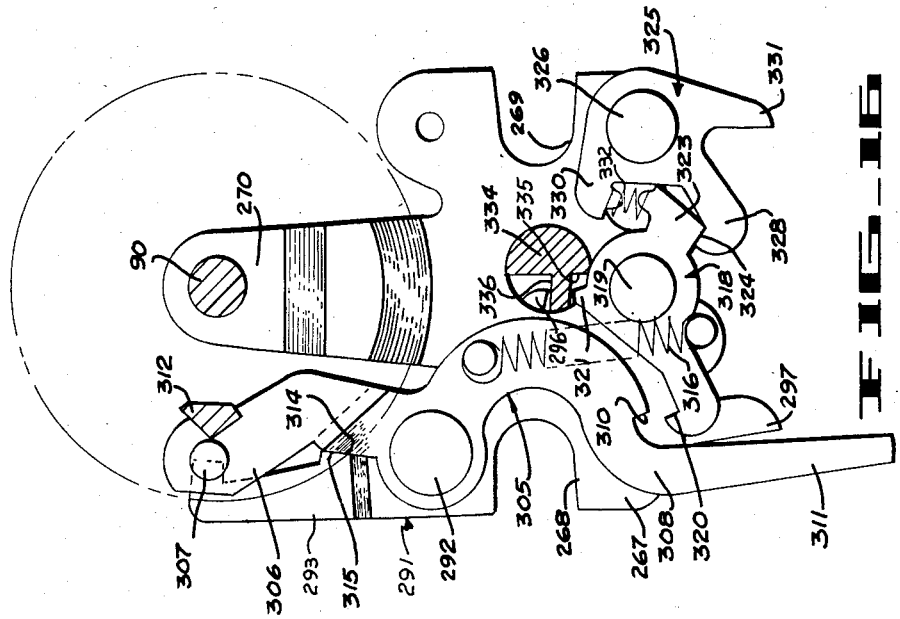
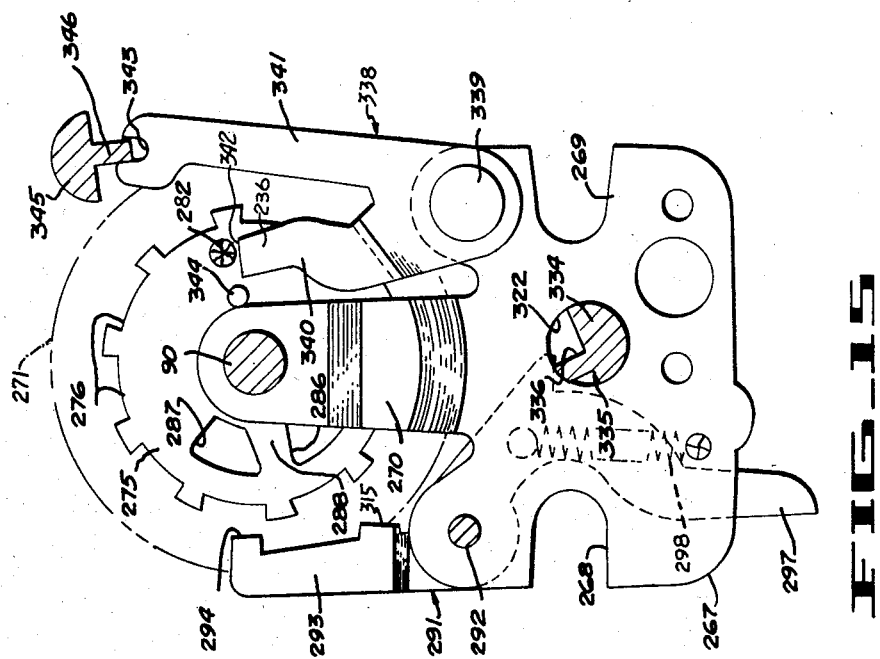

Jan. 26, 1960   M. P. MATTHEW   2,922,574
CALCULATING MACHINE
Filed Feb. 19, 1958   14 Sheets-Sheet 13

Jan. 26, 1960   M. P. MATTHEW   2,922,574
CALCULATING MACHINE
Filed Feb. 19, 1958   14 Sheets-Sheet 14
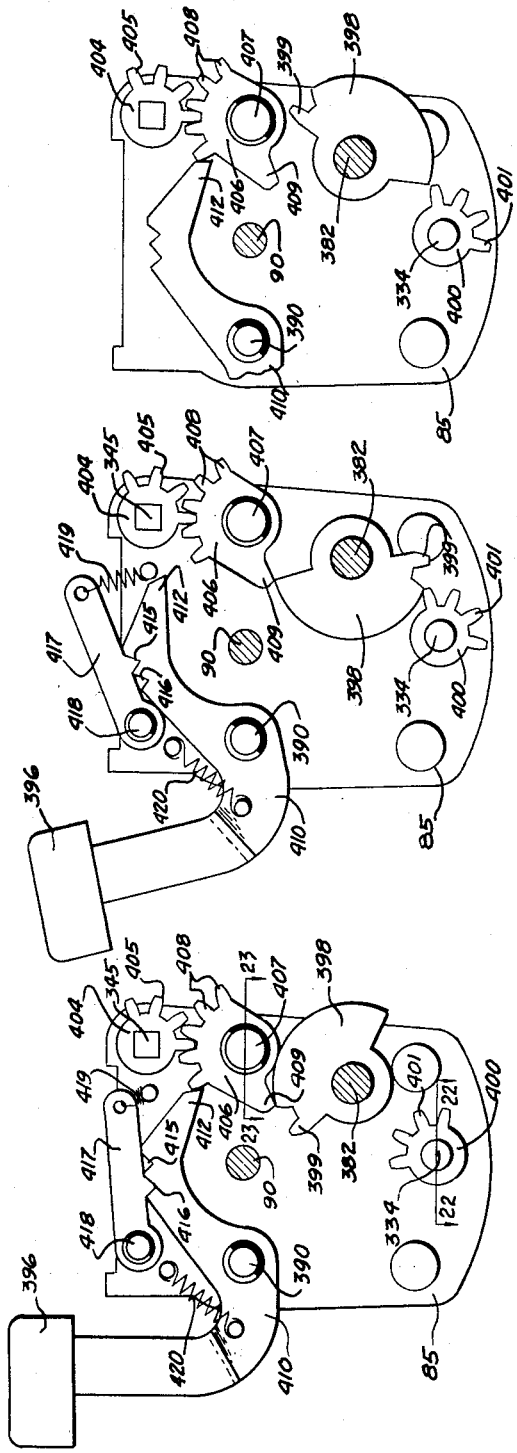
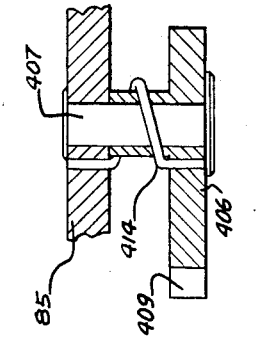
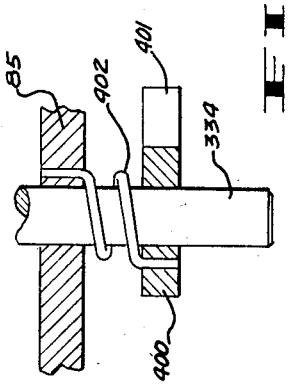

United States Patent Office 2,922,574
Patented Jan. 26, 1960

2,922,574

CALCULATING MACHINE

Morton P. Matthew, Silvermine, Conn., assignor to Friden, Inc., a corporation of California Application February 19, 1958, Serial No. 716,169

19 Claims. (Cl. 235—63)

This invention relates to power-driven mechanical calculating machines and more particularly to a calculating machine mechanism having registers including dials rotatably mounted on register drive shafts. The rotation of each of the dials is controlled by individual dial clutch assemblies drivingly connecting the drive shafts selectively and chronometrically with the dials to read values into, or out of, the corresponding registers. The machine is also provided with a selection and an actuating mechanism and control means for conditioning the registers to receive values, either additively or subtractively, and to read out values for inter-register transfer and other purposes. This application is a continuation-in-part application of application S.N. 492,885, filed by Morton P. Matthew, March 8, 1955, under the title "Calculating Machine," which application has been abandoned.

It is among the objects of the invention to provide a calculating machine having a selection mechanism, a register mechanism, and an actuation mechanism effective to transfer values from the selection mechanism to the register mechanism on the basis of chronometric operation of the register mechanism with relation to the cyclic operation of the actuating mechanism.

Another object of the invention is to provide a calculating machine with a selection mechanism including a ten-key keyboard and a selection register, wherein entered values are visible before being transferred additively or subtractively into the product register mechanism, and from which such values may be cancelled before entry, if desired.

Another object of the invention is to provide a calculating machine with two or more product registers which may be easily combined with suitable printing mechanism to print the values obtained in the product register mechanism.

Another object of the invention is to provide the register mechanism of a calculating machine with improved register dials, rotatably mounted on corresponding drive shafts, and individual dial clutch assemblies disposed within the dials and controllable to selectively connect the dials to the drive shafts for rotational movement of the dials to differentially set positions by the corresponding drive shafts.

Another object of the invention is to provide a calculating machine with improved registering mechanisms selectively controlled to transfer stored or accumulated values from one register to another.

A further object of the invention is to provide a tens-transfer mechanism in the improved registers of a calculating machine to effect a ten-transfer between the ordinally arranged dials in the same register, the tens-transfer operation being effective in wave form after the completion of digitation.

A further object of the invention is to provide an improved calculating machine of small size and light weight and capable of an extremely high rate of operating speed, easily operated, accurate in operation and flexible in use.

Other objects and advantages will become apparent from a consideration of the following description and the appended claims in conjunction with the accompanying drawings, wherein:

Fig. 1 is a plan view of the calculating machine mechanism including dials and dial clutch assemblies constructed in accordance with the present invention;

Fig. 2 is a fragmentary front elevational view of the mechanism shown in Fig. 1;

Fig. 3 is an elevational view of the left-hand side of the mechanism shown in Fig. 1;

Fig. 4 is an elevational view of the left-hand side of the mechanism and is similar to Fig. 3, the view being taken on the line 4—4 in Fig. 1;

Fig. 5 is a view in detail of the helical shaft control mechanism, the view being taken on line 5—5 in Fig. 4;

Fig. 6 is a fragmentary elevational view of the right-hand side of the mechanism shown in Fig. 1;

Fig. 7 is a longitudinal cross-sectional view of the mechanism taken on line 7—7 in Fig. 1;

Fig. 8 is a fragmentary sectional elevational view of the product registers, the view being taken on line 8—8 in Fig. 2;

Fig. 9 is a fragmentary sectional elevational view, showing one of the selectively controlled keys for the product registers, the view being taken on line 9—9 in Fig. 1;

Fig. 10 is a sectional elevational view of one selection dial clutch control mechanism;

Fig. 11 is a sectional elevational view of the ordinal tens-transfer control, the view being taken on line 11—11 in Fig. 1;

Fig. 12 is a sectional elevational view of an ordinal selection dial clutch and the control therefor, the view being taken on line 12—12 in Fig. 1;

Fig. 13 is a sectional elevational view of an ordinal product register dial clutch control mechanism, the view being taken on line 13—13 in Fig. 2 with parts omitted in order to simplify the drawing;

Fig. 14 is a fragmentary sectional elevational view of an ordinal product register dial clutch, the view being taken on line 14—14 in Fig. 2;

Fig. 15 is a view similar to Fig. 13, but having additional mechanism not shown in Fig. 13;

Fig. 16 is a view similar to Fig. 13, but having an ordinal dial clutch control mechanism not shown in Figs. 14 and 15;

Fig. 21 is a sectional elevational view of the mechanism shown in Fig. 19, the view being taken on line 21—21 in Fig. 20;

Fig. 22 is a sectional plan view, taken on the plane indicated by line 22—22 in Fig. 21;

Fig. 23 is a sectional plan view, taken on the plane indicated by line 23—23 in Fig. 21;

Fig. 24 is a view similar to Fig. 21, showing the clear control mechanism in a partial cyclic clear operated condition;

Fig. 25 is a view similar to Fig. 21 with the parts illustrated in their fully operated condition.

General organization

Figure 17:
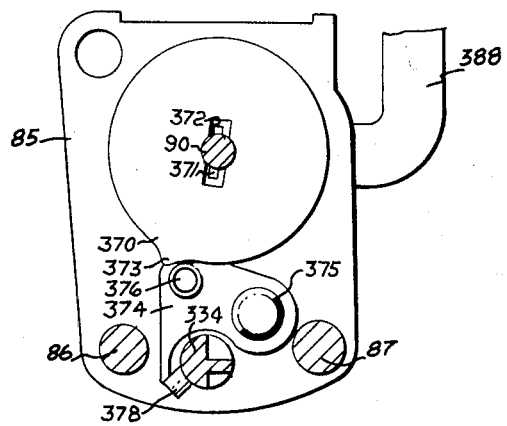
Fig. 17 is a fragmentary sectional elevational view taken on the inside of the right side frame in the plane indicated by line 17—17 in Fig. 1.

With reference, particularly to Figs. 1 and 2, the mechanism, as illustrated, includes a frame, generally indicated at 25, and including spaced-apart and substantially parallel end plates 26 and 27 and an outboard plate 28, spaced from, and substantially parallel to, the right-hand frame plate 27. Tie rods 29, 30, 31, 32, 33 and 34 (Fig. 7) extend between, and are secured to, side plates 26 and 27 to rigidly hold these plates in properly spaced relationship to each other, while outboard plate 28 is supported on an extension of tie rods 29 and 32 beyond end plate 27.

An electric motor 36 (Figs. 3 and 4) is secured to the rearward portion of the left-hand frame plate 26 with its shaft 37 extending parallel to the tie rods in the machine, and having a drive gear 38 secured thereon. A gear 39, enmeshed with drive gear 38, is journalled on a stud 40, secured on left side frame 26. A ratchet wheel 41, carried by gear 39 and concentric therewith, provides the driving side of a clutch mechanism. The driven side of the clutch comprises a disk 42, secured to a gear 43, journalled on the stud 40, adjacent ratchet wheel 41. A clutch pawl 45 is pivotally mounted at 44 on clutch disk 42 and is provided at one end adjacent the pivotal mounting 44 with a lateral projection 46 for engagement with the teeth of the ratchet wheel 41 under the urgency of a spring 47. The projection 46 on clutch pawl 45 is normally maintained out of engagement with the teeth of ratchet wheel 41 by means of a clutch control arm 48 secured at its one end on the left-hand end of a shaft 50, journalled adjacent its ends in frame plates 26 and 27. At its free end, arm 48 is formed to provide a shoulder 51, which, in the clutch releasing position of arm 48, engages a toothed portion 52 on the free end of clutch pawl 45 to maintain the projection 46 out of engagement with ratchet wheel 41. Thus, the gear 39 is freely rotatable relative to gear 43. Arm 48 is normally maintained in the clutch disengaging position, as seen in Figs. 3 and 4, by means of a spring 64. However, upon counter-clockwise rocking movement of shaft 50, arm 48 is rocked against the urgency of spring 64 to remove shoulder 51 out of engagement with toothed portion 52, thereby enabling projection 46 on pawl 45 to be rocked counter-clockwise into engagement with a tooth on ratchet wheel 41 under the urgency of spring 47, drivingly connecting motor gear 38 with gear 43. A roller 53 is carried by arm 48, adjacent the free end thereof, and is adapted upon counter-clockwise rocking movement of arm 48 to ride on the peripheral edge of clutch disk 42 to maintain shoulder 51 out of the path of the tooth portion 52 on pawl 45 for one complete cyclic rotation of gear 43. Near the end of this cyclic rotation, roller 53 drops into a depression 54 in the periphery of disk 42 under the urgency of spring 64, thereby moving shoulder 51 into position for engagement with the tooth portion 52 of the pawl 45, disengaging projection 46 from ratchet 41. The counter-clockwise rocking movement of shaft 50 is under the control of mechanism to be described hereinafter.

Gear 43 provides the control for the entry of values into a selection mechanism and also for the additive and subtractive transfer of the values from the selection mechanism into the product registers. Gear 43 is enmeshed with one gear 56 of a pair of similar gears 55, 56 (Figs. 1, 3 and 4), journalled in spaced-apart relation on a stub shaft 58, secured on frame plate 26. Gear 43 also serves to drive gear 55 through a pair of idlers gears 60, 61, journalled on a stub shaft 62, secured on frame plate 26. Gear 60, in mesh with gear 43, is secured on one end of a sleeve, which, at its other end, carries gear 61 in mesh with gear 55, so that the gears 55 and 56 are driven in respectively opposite directions, and at the same speed. It is contemplated that motor 36 will run continuously while the machine is in operation. However, the operation of the main drive gear 43 and oppositely rotating gears 55 and 56 will be controlled entirely by engagement and disengagement of the cyclic clutch. If desired, switching means could be provided for the motor under control of the various operational keys.

The mechanism illustrated includes two product, or accumulator, registers, generally indicated at 65 and 66, a selection register, generally indicated at 67, a ten-key keyboard, generally indicated at 68, and a helical, or screw, shaft 69 for ordinally stepping the selection register to the left, as viewed in Fig. 1, the digits of a selected value being entered into the selection register 67 by the keyboard.

Each of the accumulator registers 65 and 66 is constructed as a unit rockably supported within the framework of the machine for purposes to be hereinafter described. The register 65 has a frame, including end plates 70 and 72 (Figs. 1, 3 and 4), rigidly held in spaced-apart and parallel relationship by tie rods (not shown) extending between the end plates and secured thereto in spaced-apart and parallel relationship to each other. Each end plate 70 and 72 is provided with a boss serving as a journal for each end of a dial supporting and driving shaft 75, and also as a pivotal support for the product register 65, at its one end on bracket 356 (Fig. 9) and at its other end on a bracket (not shown) similar to bracket 389, seen in Figs. 19 and 20. Each of the brackets is secured to respective frame plates 26 and 27 and retain register 65 in a position such that end plates 70 and 72 lie in the same plane as plates 26 and 27, respectively. A pair of similar gears 76 and 77 are journalled on the extended left end of shaft 75 in spaced-apart relationship, similar to that of, and are meshed with, respective gears 55 and 56.

The accumulator register 66 is similar to register 65 and includes end plates 84 and 85, held in spaced-apart parallel relationship by the tie rods 86 and 87 (Fig. 7) extending between, and secured to, the end plates at the lower corners thereof. Each of the tie rods 86 and 87 is provided with a series of annular grooves 88 (Fig. 2) ordinally spaced-apart in accordance with the spacing of the dials in the register. Each of the end plates 84 and 85 is provided with bearing bosses which serve as a journal for each end of a dial supporting and driving shaft 90 and also serve as a pivotal support for the register 66 in bracket 356 at the left end thereof and in bracket 389 at its right end, as seen in Figs. 2, 9, 19 and 20. As explained hereinbefore, each of the brackets 356 and 389 are secured on respective frame plates 26 and 27 and maintain end plates 84 and 85 in the same plane as side frame plates 26 and 27, respectively.

A purality of ordinally arranged dial assemblies, generally indicated at 91 (Figs. 1 and 2) and to be later described in detail, are mounted on shaft 90 between the end plates 84 and 85 in a manner such that shaft 90 may be rotated independently of the dial assemblies. At its left end, extending beyond end plate 84, shaft 90 carries a pair of similar gears 92 and 93 journalled thereon. Gears 76, 77, and 92, 93 are identical and are spaced-apart an equal distance on respective shafts 75 and 90 and are meshed with gears 55 and 56, respectively (Figs. 1, 3 and 4.)

To complete the train of gears from gear 43 on the driven side of the main clutch to the helical, or screw, shaft 69, a gear 125 enmeshed with gear 93 is secured on the left end of a square shaft 124, journalled at its ends in frame plate members 26 and 27, and having a gear 195 slidably and nonrotatably mounted thereon intermediate frame plates 26 and 27. Gear 125 also meshes with a gear 130 journalled on a stub shaft 131 secured on frame plate member 26. Gear 130 meshes with gear 127, slidably and rotatably mounted on the reduced end of helical shaft 69, journalled at its ends in frame plate members 26 and 28 and intermediate its ends in frame plate member 27. The face of gear 130 is sufficiently broader than that of gear 127 (Figs. 1, 3, 4 and 5) so that regardless of the lateral movement of gear 127 on shaft 69 the gear wil remain enmeshed with gear 130. It will be noted that the ratio of the gears in the gear train is such that for each cyclic rotation of the main clutch, gear 127 becomes selectively operatble to impart a cyclic rotation to helical shaft 69.

In the normally inoperative position of gear 127, as seen in Fig. 5, the engagement and operation of the main clutch is ineffective to impart rotation to screw shaft 69. However, upon movement of gear 127 to the right, as viewed in Fig. 5, a pin 128 on gear 127 is moved to a position underlying a pawl 129 (Fig. 4) secured on screw shaft 69 adjacent frame plate 26, so that with each cyclic rotation of gear 127 a similar rotation is imparted to screw shaft 69. To control the engagement of pin 128 with pawl 129 on shaft 69, gear 127 is provided with a hub 127' having an annular groove 257 therein, engaged by a pin 256 on the upper end of the vertical arm of a bellcrank 258 pivoted at 259 on an ear formed at right angles to a bracket 255, spaced from, and secured on, frame plate member 26 by a shoulder screw 425. The horizontal arm of bellcrank 258 extends laterally (Figs. 1 and 5) and at its end underlies one arm of a lever 426, pivoted on frame plate member 26. The other arm of lever 426 overlies a pin 427 (Fig. 8) on an arm 428 secured on a transverse shaft 429, journalled in auxiliary frame plate members 430 and 431 secured in the framework of the machine by tie rods 30 and 31. Bellcrank 258 is normally urged counter-clockwise, as viewed in Fig. 5, by a spring 432 to normally retain gear 127 and pin 128 thereon out of engagement with pawl 129 on shaft 69. At its right end (Fig. 1) shaft 429 carries an arm 433 secured thereto and having a lateral extension 434 overlying a shoulder provided on one arm of a pair of similar arms 151 of a bail, generally indicated at 150 (Fig. 7), for control by each of the numeral keys in the keyboard upon depression thereof, as will now be described.

Referring to Figs. 1 and 2, a torsion spring 260 is mounted on the right end of helical shaft 69 positioned between right frame plate member 27 and outboard plate member 28 and is connected at its left end to the shaft 69 and at its right end the spring is secured in plate member 28. Spring 260 is sufficiently larger than the reduced end of the shaft 69 which it encircles so that with each cyclic clockwise rotation of shaft 69, as viewed in Figs. 3 and 4, the spring is partially wound. A holding means becomes effective immediately following each cyclic clockwise rotation of shaft 69 and winding of the spring 260 to restrain the shaft 69 in its full-cycle position. For this purpose, a notch is provided in the upper end of one arm of a bellcrank 435 (Fig. 4), pivotally mounted on the shoulder screw 425 securing bracket 255 to frame member 26, and is resiliently urged by a spring 436 into engagement with pawl 129 on shaft 69. Spring 436 is secured at its lower end on a pin on frame member 26 and at its upper end is supported on a pin 437 on the outer end of the horizontal arm of bellcrank 435.

*Keyboard*

The keyboard, generally indicated at 68 in Figs. 1 and 2, is comprised of spaced-apart and parallel side frames 133 and 134, mounted at their bottom edge on main frame tie rods 30 and 31, as seen in Fig. 7. A top plate 135 extends between, and is secured in, side plates 133 and 134 by tie rods 136 (Fig. 7), which also serve to provide fulcrums for the keys in the keyboard. There are nine digit keys 138 numbered from "1" to "9" and arranged in a 3 x 3 pattern. Each key 138 has a lever, or stem, 139 rockably mounted intermediate its length on a corresponding tie rod 136 and is provided with a key top 140 mounted on one end of the stem and disposed above the top plate 135 of the keyboard frame.

Each key 138 is effective, upon depression thereof, to move gear 127 and its pin 128 to the right, as viewed in Fig. 5, to position pin 128 beneath pawl 129 on helical shaft 69, to engage the main clutch and to release each ordinal dial of the selection register 67 successively from left to right, as viewed in Fig. 1, for the registration of a value in accordance with the key depressed. Each key stem 139 (Fig. 7) pivotally supports a live pawl 142 adjacent the rearward end thereof. The live pawls, or levers, 142 extend above and below the corresponding key stems, and at their lower end, support one end of springs 143, which, at their other ends are secured on a tie rod 144 suitably supported at its ends in side plates 133 and 134 of the keyboard section. Springs 143 resiliently maintain the pawls 142 in an upright position and also serve to urge keys 138 to their raised position. The rearward end of the key stems 139 and the associated pawls 142 are ordinally arranged in a row extending transversely of the machine. Each pawl 142 cooperates with the corresponding one of a series of nine pins 148, carried on shaft 69, to control the registration of each digit value as will be described under the heading "Selection register control."

To effect translation of gear 127 to the right, as seen in Fig. 5, and to enable engagement of the main clutch, a bail, generally indicated at 150 (Figs. 1 and 7), is provided. Bail 150 extends transversely of the keyboard frame and comprises a pair of similar arms 151, pivotally mounted one on each of the keyboard frame plates 133 and 134 and supporting a pair of spaced-apart and parallel rods 152, 153. The rearward end of each of the key levers 139 underlies the transverse bail rod 152 and becomes effective therethrough upon depression of a key 138, to rock the bail 150 in a clockwise direction. An arm 154 is provided at its forward end with a fork formation embracing bail rods 152 and 153 intermediate the ends thereof and becomes effective, upon rocking of bail 150, to impart a clockwise rocking movement to clutch control shaft 50 under the control of mechanism now to be described. Arm 154 is positioned adjacent an arm 168 and at its rearward end is pivotally mounted in an annular groove in the hub of the arm 168 secured on shaft 50. A latch pawl 170 is pivotally mounted on the free end of arm 168, and at its lower end, is provided with a notch 169 which is normally urged by a spring 166 into engagement with an ear 167 formed at a right angle to, and intermediate the ends of arm 154. Thus, it can be seen that upon depression of a digit key 138, bail 150 is rocked clockwise (Fig. 7) and rod 152 becomes effective to impart a clockwise rocking movement to arm 154 and therefore shaft 50 to rock clutch control lever 48 (Fig. 4) in a counter-clockwise direction to engage the main clutch for one cycle of operation.

The "0" key 155 (Figs. 1, 3 and 4) is disposed to the left of the digit keys 138 in alignment with the lower row of keys and comprises a key top 156 mounted on a key stem, or lever, 157 pivotally mounted at its rearward end on a shaft 247 journalled in auxilary frame plates 430 and 431. The vertical portion of key stem 157 is extended downwardly and overlies a laterally extended pin 158 on the forward end of a lever 159 rockable about a tie rod 136 and extending rearwardly for control of bail 150 in a manner similar to key stems 139. The "0" key lever 159 does not, however, carry a live pawl, or lever, 142 and serves only to engage the main clutch and enable the operation of screw shaft 69.

*Selection register control*

Upon depression of a digit key 138 and the subsequent engagement of the main clutch, the cyclic rotation of the helical shaft 69 becomes effective to move the selection register 67 one ordinal step to the left from an inactive to an active position when one of the series of nine pins 148, projecting radially from shaft 69, becomes effective to cause a registration in the selection register 67 in accordance with the digit key depressed. The pins 148 are respectively disposed ordinally and longitudinally of shaft 69 in alignment with the upper end of the live tips of pawls 142 and are differentially arranged spirally around the shaft 69 in accordance with a specific digit value. The spiral arrangement of the pins 148 is such that each pin and the corresponding pawl 142 become effective, following a predetermined angular increment of rotation of shaft 69, to cause a registration in the ordinally active dial of the selection register 67. A bail 145 (Fig. 7) extends transversely of the keyboard 68 immediately rearward of the upper ends of the pawls 142 and is supported at each end on similar arms pivotally mounted on keyboard frame plates 133 and 134.

An angularly disposed ear 146 on bail 145 projects upwardly in a position immediately to the left of the leftmost inactive dial in the selection register 67. The angular disposition of the pins 148 on shaft 69 is such that, upon depression of the "9" key, the pawl 142 associated therewith is moved upwardly to position the upper end thereof in the path of the aligned pin 148. During the first 36° counter-clockwise rotation of shaft 69 (Fig. 7), the aligned pin 148 engages the operatively positioned pawl 142 rocking it clockwise to impart a clockwise rocking movement to bail 145. If the "8" key is depressed, the pin 148 aligned with the pawl 142, associated with the "8" key, will engage the pawl in approximately 72° rotation of the shaft 69 to rock the bail 145 clockwise. In a similar manner, the pin 148 aligned with the operatively positioned pawl 142, associated with the "7" key, will become effective to impart clockwise rotation to the aligned pawl 142 and bail 145 in approximately 108° rotation of shaft 69. The same sequence follows for the other keys so that if the "1" key has been depressed, the pawl 142 associated therewith will have been moved to its operative position and the pin 148 aligned therewith becomes effective in approximately 324° rotation of shaft 69 to impart clockwise rotation to the operatively positioned pawl 142 and bail 145. The ear 146 on the bail 145 becomes effective upon clockwise rocking thereof, as viewed in Fig. 7, to effect actuation of the selection register 67 in a manner later to be described.

*Selection register*

Selection register 67 is comprised of a frame including end plates 174 and 175 secured in spaced-apart and parallel relationship to each other by parallel tie rods 176 and 177 (Figs. 1, 7 and 8). Each of the tie rods 176, 177 is provided with uniformly spaced-apart annular grooves 173, the purpose of which will presently appear. Each of the end plates 174 and 175 is provided at their upper end with a lobe projecting forwardly of the register and apertured to receive a transverse guide rod 179, secured at its ends in frame plate member 26 and outboard plate member 28. At the lower end thereof, each of plates 174 and 175 is provided with a forwardly extended lobe having a semi-circular notch in the lower edge thereof for engagement with a guide rod 178 supported at its ends on arms 180 and 191 (Figs. 6 and 8) pivotally mounted at 182 on respective frame plates 28 and 26. Guide rods 178 and 179 are parallel and serve to guide the selection register 67 in its movement transversely of the keyboard 68. Guide rod 178 serves an additional function, that of rocking selection register 67 about shaft 179, when the rod 178 is rocked counter-clockwise about the pivots 182, to position the register 67 for a "readout" operation. The rocking of the selection register 67 to its "readout" position is under the control of addition key 80 or the subtraction key 81 (Fig. 1). Register 67 is normally urged to its "readin" position by a spring 181 (Fig. 7) supported at its one end on guide rod 178 and at its other end on tie rod 31.

A dial shaft 192 extends transversely of the selection register 67 and is journalled at its ends in end plates 174 and 175. A series of ten dial assemblies 193 are mounted in ordinal arrangement on shaft 192 between the end plates 174 and 175, the shaft 192 being normally rotatable independently of the dial assemblies 193. A driving gear 194 is enmeshed with gear 195 and is mounted on the leftmost end of shaft 192 (Fig. 1) beyond an adjacent end plate 174. It will be recalled that gear 195 is slidably and non-rotatably mounted on square shaft 124 so that each cyclic rotation of gear 195 imparts a cyclic rotation to shaft 192.

In order to effect the registration of a value in the selection register 67 it is necessary to merely successively depress keyboard digit keys 138 corresponding to the digits to be entered beginning with the highest order digit of the selected value. Thus, the depression of each key 138 or the "0" key 155, during this operation, effects a single cycle of rotation of the helical shaft 69 while the selection register 67 is maintained in its normal or "readin" position by spring 181. This cyclic rotation of shaft 69 serves to move the selection register 67 one ordinal space to the left or into active position, as viewed in Figs. 1 and 2. To effect the ordinal movement of the register 67 to the left, the end plate 174 is provided with a projection 242 (Fig. 8) which is engaged in the helical thread or groove in shaft 69, the pitch of the helix being such that a one-step movement of the register is effected with each cycle of rotation of shaft 69. With each ordinal movement of selection register 67 to the left, gear 195 slidable on square shaft 124 is maintained in mesh with gear 194 so that with each cyclic operation of the machine a cyclic rotation is imparted to shaft 192. To retain the gear 195 in mesh with gear 194 in any position of the register 67, the hub of the gear 195 is provided with an annular groove 190 in which the rearward edge of end plate 174 is engaged, as seen in Figs. 1 and 8. Upon movement of the register one ordinal step to the left with each digit key depression, an ordinal register control mechanism 213 (Figs. 2, 7, 8 and 10) associated with each dial assembly 193 is moved into position for cooperation with ear 146 on bail 145 (Figs. 2 and 7) to effect registration of a digit in the actively positioned dial in accordance with the key depressed. The width of the ear, or projection, 146 is such that a very slight movement of the register 67 is required to position the register control mechanism 213 associated with the actively positioned dial assembly 193 into cooperative relation with ear 146, in which position it remains for the full extent of the ordinal movement of the register.

Separator plates 196 (Figs. 7, 8, 10, 11 and 12) are disposed one between each two adjacent dial assemblies 193, these plates being mounted on the tie rods 176 and 177 and held in position by engagement in the corresponding annular grooves 173 in the rods. Each separator plate 196 is provided with an upwardly extended projection 197 having an aperture at its upper end through which dial shaft 192 passes. Each of the dial assemblies 193 of the selection register 67 comprises a thin wall cup-shaped dial 198, the peripheral flange of which carries the numerals from "0" to "9," spaced at equal intervals thereon. A notch 199 (Figs. 8 and 11) is provided in the peripheral flange of each dial 198 at the juncture of the flange with the web portion of the dial and serves, upon engagement by means to be hereinafter described, to lock the dial in the "0" position thereof.

Positioned within the hollow portion of each dial 198 is a ten-tooth star wheel 201 (Fig. 12) secured on shaft 192 and a pair of clutch dogs, or levers, 202 and 203 pivotally mounted at 137 and 147, respectively, on the web portion of the dial 198. Each clutch dog 202, 203 is disposed at opposite sides of the corresponding star wheel 201 and is provided with a tooth, adapted to engage in the notches of the star wheel under the urgency of a spring 204, secured at its ends in an aperture in each clutch dog intermediate the ends thereof. Thus, it can be seen that, in the normal condition of the parts, the tooth on each of the dogs 202 and 203 is resiliently held in engagement with the teeth of star wheel 201 to drivingly connect shaft 192 to the corresponding dial 198. A hub 200 is secured to each dial 198 extending outwardly therefrom and having an annular groove therein which serves as a journal for a clutch control disk 205 mounted adjacent the outer surface of the web portion of the dial (Figs. 10 and 11). Each disk 205 carries a pin 207 projecting through an aperture in the dial web, and is disposed between the free ends of the corresponding clutch dogs 202 and 203 (Fig. 12), which are resiliently maintained in engagement with the pin 207 by spring 204. Each of the clutch dogs, or pawls, 202 and 203, adjacent the pivotal end thereof, carries a laterally offset lug 208 and 209, respectively, projecting through suitable apertures in the dial web and into mating apertures 210 and 211, respectively, in disk 205. Each of the apertures in the dial web is sufficiently large to permit freedom of movement of the corresponding lugs 208 and 209 therein. Apertures 210 and 211 in disk 205 are separated by a spoke structure 212 of predetermined width against the respective radially disposed sides of which lugs 208 and 209 normally abut in the engaged condition of the clutch. Means is provided for engagement in a notch 206 in the periphery of each disk 205 to normally lock the disk against rotation while the associated dial 198 is locked in the "0" registering position thereof, as will be described hereinafter.

As explained above, the dials 198 and the associated disks 205 are driven in one direction only (clockwise in Fig. 10 or counter-clockise in Fig. 12) and, upon rotation thereof into the "0" registering position of the dial, movement of the disk 205 is terminated first followed by the termination of the movement of the associated dial. The driving engagement of the pawls 202 and 203 with the corresponding star wheel 201 is such that, following the termination of the rotation of a disk 205, the associated dial 198 will receive a further predetermined angular rotation to return the dial to its "0" registering position. During this predetermined angular rotation of the dial 198, the pin 207 on the disk 205 causes the pawl 203 to be rocked out of engagement with the corresponding star wheel 201. Simultaneously therewith, the spoke structure 212 of the disk 205, by virtue of the engagement of the lug 208 of pawl 202 with the adjacent radially disposed surface of the spoke structure, causes the pawl 202 to also be rocked out of engagement with the star wheel 201. Thereafter, while the dial 198 is locked in its "0" registering position and the associated disk 205 is locked in its inactive position, shaft 192 and the corresponding star wheel 201 will rotate independently of the dial. Immediately upon release of a disk 205 and the associated dial 198, spring 204 becomes effective to restore the corresponding pawls 202 and 203 to the active position shown in Fig. 12.

When the clutch control disk 205 is free to turn, spring 204 urges the corresponding clutch dogs 202 and 203 into engagement with the associated star wheel 201 to provide a driving connection between shaft 192 and the corresponding dial 198. Each clutch control disk 205 is normally held against rotation, in the "0" registering position of the dial, by a disk stop lever, generally indicated at 214 (Figs. 10, 11 and 12), pivotally mounted at 215 on the associated or adjacent right-hand separator plate 196. Lever 214 is comprised of three arms 216, 217 and 219. Arm 216 projects forwardly from the pivot point 215 beyond the forward edge of the associated separator plate 196. The arm 217 extends upwardly from the pivot pin 215 and has at its upper end a detent nose formation 218 engageable in the notch 206 of the associated clutch control disk 205 to hold this disk against rotational movement. The third arm 219 of each lever 214 extends rearwardly and downwardly from the pivotal connection 215 and is provided with a latch shoulder 220 along its rearward edge. The free end 221 of arm 219 extends below the lower edge of the separator plate 196 for a purpose to be described later. A latching bellcrank 222 is pivotally mounted at 224 on each separator plate 196 and has an upwardly extending arm 225 provided at its upper end with a shoulder 226 for engagement with the latching shoulder 220 of the associated lever 214 to releasably latch the lever 214 in the position shown in Fig. 10. Hence, the nose 218 is held out of the notch 206 of the disk 205 so that the associated dial 198 will thereafter rotate with shaft 192. The horizontal arm 227 of latching bellcrank 222 extends beyond the rearward edge of separator plate 196 and is provided at its end with a tail portion 228 for engagement by a bail 266. At the beginning of the clearing cycle of the machine, to be described hereinafter under "Selection register clearing," bail 266 is rocked (Fig. 8) to disable latching bellcrank 222 thereby releasing the disk stop lever 214 to the influence of a spring 229. Spring 229 serves to urge lever 214 in a clockwise direction, as viewed in Fig. 10, while latch lever 222 is normally urged counter-clockwise to its operative position by a spring 230.

A dial detenting member 232 (Figs. 11 and 12) is rockable on the pivotal mounting 215 adjacent lever 214 and, at its upper end, is provided with an angular projection 233 which is engageable in the dial notch 199 to releasably latch the associated dial in the "0" registering position. The downwardly extending arm 234 of detenting member 232 has an ear, formed at right angles thereto, for securing the upper end of spring 230 which resiliently urges member 232 in a counter-clockwise direction, as viewed in Fig. 12. Member 232 is also provided with a laterally extended ear 235 overlying arm 217 of lever 214, so that when lever 214 is rocked counter-clockwise (Fig. 11) to disk-releasing position, the projection 233 of member 232 is moved out of engagement with the notch 199 in the associated dial 198.

A "readout" lever 236 (Fig. 11) is pivotally mounted intermediate its length on pin 215 on each separator plate 196 and has an upwardly extended arm 237 and a depending arm 238 extending below the lower edge of the corresponding separator plate 196 immediately forwardly of the free end 221 of lever 214. At its upper end, lever 236 carries a laterally projecting pin 239 for engagement by a triangular cam 240 integral with the head of the pivot pin 147 of the right-hand or adjacent lower order dial assembly 193. The arrangement is such that, as the adjacent lower order dial 198 passes from "9" to "0," cam 240 associated therewith engages pin 239 of the lever 236, associated with the next higher order dial assembly 193, to rock the "readout" lever 236 counter-clockwise, as viewed in Fig. 11, for a purpose to be later explained in connection with the addition and subtraction operations of the mechanism. Lever 236 is normally urged by a spring 243 to the inoperative position shown in Fig. 11.

Referring now to Fig. 7 and as explained hereinbefore, the depression of each digit key 138 in the keyboard effects a clockwise rocking movement of bail 150 to provide a driving connection between gear 127 and the helical shaft 69 (Fig. 1), rocks arm 154 upwardly to effect an engagement of the main clutch and moves the upper tip of the associated pawl 142 upwardly into the path of the corresponding pin 148 on shaft 69. Immediately upon engagement of the main clutch, shafts 69 and 124 begin rotation, and the pin 148, corresponding to the depressed digit key 138, becomes effective, after a differential angular rotation of the shaft 69, to engage the operatively positioned pawl 142, rocking the pawl and bail 145 in a clockwise direction. During the cyclic rotation of shaft 69, selection register 67 is moved ordinally to the left and the leftmost inactively positioned dial 198 is moved into its active position. It will be recalled that shaft 192 normally receives one cycle of rotation, independently of the dials, with each cyclic operation of the main clutch. However, with clockwise rocking of bail 145 the associated ear 146 engages the arm 216 of the lever 214 associated with the dial assembly 193 during its movement into active position to release the corresponding clutch control disk 205 of the dial assembly 193. Upon release of the lever 214 from its engagement with the disk 205, pawls 202 and 203 of the corresponding dial assembly move into engagement with the associated star wheel 201 under the urgency of spring 204. Thereafter, shaft 192 will impart a differential angular rotation to the actively positioned dial 198 during the remainder of the cyclic rotation of shaft 192, thereby registering a number on the dial 198 in accordance with the key 138 depressed. Immediately upon release of lever 214 from engagement with the associated clutch disk 205, latch 222 (Fig. 10) becomes effective to latch lever 214 in its rocked position. The registration of a value, digit by digit, from the highest to the lowest order, continues in this manner so that, as the next lower order dial 198 is moved into its active position, it receives a number of angular increments of rotation corresponding to the number of the digit key depressed. Inasmuch as each of the levers 214 of the actively positioned dial assemblies 193 are latched in their disk-releasing position, the dials 198 to the left of the dial into which a digit is being entered, will be given a complete cycle of rotation. This cyclic rotation of these dials will not, however, change the registration initially set therein.

Automatic clutch release

Means are provided for enabling a disengagement of the main clutch, even though a digit key 138 or "0" key 155 is held depressed for more than one cycle of machine operation. For this purpose, a bail 160 is provided (Figs. 3, 4, 6, 7 and 8), having a broad intermediate portion 161 supported at its ends by arms 162 and 163 pivotally mounted on the respective frame plates 26 and 27. Arm 162 extends upwardly from its pivotal mounting on frame 26 and carries a pin 141, engaging in an elongated slot in the depending arm of a bellcrank 164 pivotally mounted on frame plate 26. The horizontal arm of bellcrank 164 carries a pin 126 for cooperation with a cam 165 secured on gear 125 for rotation therewith, and operable, during each cycle of machine operation, to impart a clockwise rocking movement to bail 160 (Fig. 7). Pin 141 supports one end of a spring 149, the other end of which is secured on the end of stub shaft 131 and serves to maintain pin 126 in engagement with cam 165.

It will be recalled that arm 154 and arm 168 (Fig. 7) are rocked upwardly by each digit key 138 and the "0" key 155 to effect engagement of the main clutch. As these arms are rocked upwardly or clockwise, the upper end of latch pawl 170, pivotally mounted on arm 168 and normally spaced from the lower end of a tongue 171, is moved into engagement with the tongue. The tongue 171 is secured on, and extends downwardly from, the intermediate portion 161 of bail 160 and becomes effective, upon rocking of bail 160 at the end of each cycle of machine operation, to release the notched end of the pawl 170 from engagement with the ear 167 on arm 154. Spring 64 (Fig. 4) then serves to restore clutch control arm 48 to the active position shown. The machine is therefore limited to a single cycle of operation and the digit key 138 or the "0" key 155 must be released to re-establish the connection between arm 154 and arm 168. A spring (not shown) urges arm 154 downwardly upon release of a digit key 138 or the "0" key 155 to the position shown in Fig. 7, whereupon ear 167 engages an extended abutment 169 of the arm 168 and spring 166 then moves the notch in the lower end of pawl 170 into engagement with ear 167, thereby enabling arms 154 and 168 to function as a unit for controlling the rocking movement of shaft 50.

Selection register clearing

After a value entered into the selection register 67 has been transferred from the selection register into a product or accumulator register in a manner presently to be described, or if it is desired to cancel an erroneous value from the selection register, the selection register may be cleared and returned to its initial position by a depression of the "Clear" key 245 (Figs. 1 and 3). The "Clear" key 245 comprises a key top 248 secured on the upwardly extended forward end of a key stem 246, secured intermediate its ends on shaft 247, journalled in auxiliary plate members 430 and 431. At its rearward end, the key stem, or lever 246 carries a laterally extended ear 249, supporting one end of a spring 250, the other end of which is secured to a stud on frame 430 and serves to urge "Clear" key 245 to its raised position. Ear 249 underlies the end of the extended pin 437 carried by the cyclic latching bellcrank 435, which, upon depression of the key 245, will be moved out of engagement with pawl 129 on shaft 69. The ear 249 on key lever 246 also underlies the forward end of an arm 262, secured at its rearward end on shaft 50. Thus, it can be seen, that upon depression of the "Clear" key 245 the main driving clutch is engaged so that the selection register dial shaft 192 will be given at least one cyclic rotation and cycle latch 435 is released from its engagement with pawl 129 on shaft 69. The spring 260, which has been wound with each cyclic rotation of shaft 69 while moving the selection register into its active position, now becomes effective to rotate helical shaft 69 in a counter-clockwise direction, as viewed in Fig. 3, to restore the selection register 67 to its initial or inactive position, as seen in Fig. 1.

Simultaneously, with the engagement of the main clutch and the release of the helical shaft 69 to the influence of the wound spring 260, levers 214 and detent arms 232 (Figs. 10 and 12) are restored to their active position, wherein they will engage the respective notches 206 and 199 in the "0" position of each of the previously differentially adjusted dials 198. To enable springs 229 and 230 to restore the respective levers 214 and 232 to their active position, latches 222 are rocked in a clockwise direction by means of a bail 266, extending transversely of the machine and overlying the extensions 228 of latch levers 222 of the actively positioned dial assemblies 193 in the selection register 67. Bail 266 (Figs. 3 and 7) is secured on a shaft, journalled at its ends in frame plate members 26 and 27. At its leftmost end, the bail shaft carries an arm 265 pivotally mounted at its free end on the upper end of a link 264 which is pivoted on the rearward end of an arm 263 secured on shaft 247. A depression of the "Clear" key 245, therefore, through arm 263, link 264 and arm 265, imparts a clockwise rotation to bail 266 (Fig. 3), or counter-clockwise, as viewed in Fig. 7, to release the latch members 222 of all the differently adjusted dial assemblies 193. Each of the adjusted dials will thereafter be restored to its "0" position during the first cycle of rotationu of shaft 192. Should the "Clear" key be held down for more than one cycle of operation, it will not affect the zeroizing of the register, since the shaft 192 will then rotate independently of the dials 198.

While the "Clear" key 245 has been shown as the only instrumentality for clearing the selection register 267, it is to be understood that this function could also be accomplished by the addition and subtraction keys 80 and 81 through a connection between these keys and bail 266 and the cycle latch 435, which mechanism would be within the skill of a mechanic trained in this art.

Product registers

While two product or accumulator registers, each containing twenty dial assemblies, are illustrated, and since the two registers may be identical in construction and operation, a detailed description of one only is considered sufficient for the purposes of the present disclosure. Also, since the dial assemblies may be identical in construction and operation, it is believed a description of one such dial assembly will suffice for all. Each of the registers 65 and 66 is supported in the framework of the machine in a similar manner as explained above, and the operation of each of the registers during addition and subtraction is under the control of similar clutches, positioned respectively between gears 76, 77 on shaft 75 of register 65 and between gears 92, 93 on shaft 90 of register 66.

A pair of clutch elements 94 and 95 (Figs. 1, 3 and 4) are pivotally mounted on respective ends of a support member 63, secured on register shaft 90 between gears 92 and 93 and are respectively and alternatively rockable into and out of engagement with these gears to selectively connect either gear to the shaft 90. The gears 92 and 93, it will be recalled, are journalled on shaft 90 and are enmeshed with gears 55 and 56, respectively, for rotation in opposition directions. Each of the gears 92, 93 is provided on its side adjacent the other of these gears, with a disk hub concentric with the shaft 90 and having at least one notch in the peripheral surface thereof. At its lower end, each of the clutch elements, or levers, 94 and 95 is provided with an ear formed at right angles thereto for selective engagement in the notch of the disk secured on gear 93 or the notch of the disk secured on gear 92, respectively. Either the laterally projected ear on lever 94 engages the notch in the disk on the gear 93 or lever 95 engages the notch in the disk on gear 92, selectively, under the urgency of a spring 89, secured at its ends in the upwardly extended arms of the levers 94 and 95. The arrangement of the levers 94 and 95 on the support member 63 is such that the ear on one lever will overlie the ear on the other, thereby preventing simultaneous engagement of the levers with the corresponding gears 93 and 92. Therefore, it becomes apparent that the direction of rotation of shaft 90 is controlled by the selective engagement of lever 95 with gear 92 or lever 94 with gear 93, i.e., the driving connection of gear 92 with shaft 90 serves to rotate shaft 90 in a clockwise direction. However, if lever 94 connects gear 93 to shaft 90, the rotation of the shaft 90 is in a counter-clockwise direction, as viewed in Fig. 3.

The clutch control for the shaft 75 of the accumulator register 65 is similar to that of the clutch on shaft 90. The clutch control for the register 65 comprises a pair of clutch elements, or levers, 78 and 79 (Fig. 1) pivotally mounted on the respective ends of a supporting yoke secured on shaft 75 and engageable selectively with respective gears 76, 77 to control subtraction or addition in the register 65. The clutch elements 78 and 79 are moved into and out of operative position by a pivoted yoke (not shown), connected by a suitable linkage and lever mechanism to the add and subtract keys 80 and 81 of the machine. Similar clutch actuating mechanism is illustrated in connection with the product or accumulator register 66, presently to be described.

A shaft 100 (Figs. 3, 4 and 6) extends transversely of the machine and is journalled at its ends in side frame plates 26 and 27. At its leftmost end, shaft 100 carries an arm 101 secured thereon and pivotally connected to the lower end of a link 102, the upper end of which is pivotally connected to a yoke 96, pivoted at 97 on a bracket 103 secured on, and spaced from, side plate member 26. The arms 98 and 99 of yoke 96 are effective to control the engagement of clutch levers 95 or 94 with the corresponding gears 92 or 93, respectively. For addition, yoke 96 is rocked counterclockwise, as viewed in Figs. 3 and 4, when the arm 99 thereof rocks the associated clutch lever 95 counter-clockwise, thereby enabling the ear on clutch control lever 94 to rock into engagement with the notch in the disk of gear 93 to effect a counter-clockwise rotation of shaft 90. Conversely, a clockwise rocking movement of yoke 96 effects a subtractive registration in the register 66, when arm 98 of the yoke disables the associated clutch lever 94, enabling the clockwise rocking of clutch lever 95, under the urgency of spring 89, to move its ear into engagement with the notch of the disk on gear 92, thereby effecting a clockwise rotation of shaft 90.

Referring to Fig. 6, a lever arm 104 is secured on the right-hand end of shaft 100 and carries a pin 105 and 106 at its respective ends, substantially diametrically opposed. A bellcrank 107 is pivotally mounted on a stub shaft 108, carried by a bracket 109, secured on outboard frame plate 28. The lower end of one arm of bellcrank 107 is adapted for engagement with stud 105 on arm 104, as shown in phantom line in Fig. 6, while the other arm of the bellcrank is pivotally mounted at 110 on the key stem 111 of the addition control key 80. The key stem 111 is guided in its substantially vertical movement by the engagement of a bifurcation 112 in the lower end thereof with a roller 113 mounted on the forward end of an auxiliary plate 114 secured on side plate member 27. A second bellcrank 115 is also pivotally mounted on stub shaft 108 adjacent bellcrank 107, having one arm thereof adapted for engagement at its lower end with roller 106 on arm 104, as viewed in Fig. 6. The other arm of bellcrank 115 has a pivotal connection at its end with a key stem 116 of the subtract key 81 (Fig. 1), the pivotal connection being similar to that at 110 for bellcrank 107. Key stem 116 is positioned adjacent key stem 111 and is guided in its substantially vertical movement by the engagement of a similar bifurcation 112 in the lower end thereof with the extended roller 113. Springs 117 and 118, secured at their lower end on a stud on auxiliary plate 114 and at their other ends in respective bellcranks 107 and 115, serve to urge the add and subtract keys 80 and 81 to their raised position.

Thus, it will be seen that a depression of the addition control key 80 will rock lever arm 104 counter-clockwise from the position indicated by phantom line in Fig. 6 to the full line position. In the full line position of the arm 104, yoke 96 has been rocked counter-clockwise to effect a counter-clockwise directional rotation of dial shaft 90. Conversely, a depression of subtraction control key 81 will rock lever arm 104 from the position shown to the position indicated by phantom line in Fig. 6, thereby imparting a counter-clockwise rocking movement to shaft 100 (Fig. 3) and a clockwise movement to yoke 96, whereby the associated clutch mechanism will become effective to condition shaft 90 for rotation in a clockwise or subtractive direction. If desired, control mechanism may be provided for register 65, similar to the control mechanism for register 66, and rendered selectively operable for control by rocking movement of shaft 100.

Means are provided for control by a depression of either the addition key 80 or subtraction key 81 to initiate cyclic operation of the main clutch. For this purpose, a lever 120 is pivotally mounted at its one end on stub shaft 108 and adjacent thereto carries a laterally extended pin, or roller, 187 overlying one arm of each of bellcranks 107 and 115 (Fig. 6). The substantially horizontal extension 185 of lever 120 underlies a pin 122 on the free end of an arm 121, secured on clutch control shaft 50. Thus, upon depression of either key 80 or 81, lever 120 is rocked counterclockwise to impart a clockwise rocking movement to shaft 50, thereby effecting an engagement of the main clutch, as previously described.

A plurality of separator plates 267 are provided in register 66, one between each of the adjacent dial assemblies 91 of the register (Figs. 7, 8, 13, 15 and 16). Each separator plate 267 is provided with oppositely disposed notches 268 and 269, engaged in ordinally spaced annular grooves 88 in tie rod 86, as seen in Fig. 2, and similar annular grooves in tie rod 87 of the register frame. The upper end of an upwardly extended portion 270 of each separator plate 267 is apertured to receive the shaft 90. The dials 271 of each dial assembly 91 are similar to the dials 198 of the selection register 67, each having a hub 272 journalled on shaft 90. The peripheral flange of each of the cup-shaped dials 271 is provided with equiangularly spaced-apart digits "0" to "9" and a series of uniformly spaced-apart notches 273 are provided in the peripheral flange at the juncture of the flange with the web of the dial, a notch 273 for each of the numerals thereon.

A clutch control disk 275 is journalled for rocking movement on each hub 272 adjacent the outer surface of the corresponding dial. Each disk 275 is provided with a series of ten uniformly spaced-apart peripheral notches 276 and a pair of apertures 286 and 287, separated by a spoke structure 288. A plurality of star wheels 277 (Fig. 14) are secured on shaft 90 and are disposed one within each of the hollow dials 271 for cooperation with a pair of opposed clutch dogs, or pawls, 278 and 279 which are pivotally mounted at their ends at 280 and 281, respectively, on the inner surface of the web portion of each dial. Each clutch pawl 278 and 279 has a tooth, normally urged by a spring 289 into engagement with the notches of the corresponding star wheel 277, thus providing a driving connection between shaft 90 and the corresponding dial 271. The spring 289 is secured in apertures intermediate the ends of the clutch pawls 278 and 279 and also serves to maintain the free ends of the clutch pawls in engagement with a pin 282 secured on clutch control disk 275 and extending through an aperture 283 in the dial web. Adjacent the pivotal mounting thereof, each dog 278 and 279 carries respective lugs 284 and 285 which extend through apertures in the dial web and into the respective apertures 286 and 287 in the clutch control disk 275. In the clutch engaging condition of the parts, as seen in Fig. 14, the pawls 278 and 279 are operatively engaged in notches of the corresponding star wheel 277 and the respective lugs 284 and 285 abut the adjacent radially disposed surfaces of the spoke structure 288. To disengage the clutches, the pawls 278 and 279 are moved out of engagement with the corresponding star wheel 277 in a manner similar to the disengagement of the pawls 202 and 203 with the corresponding star wheel 201, as described hereinbefore. However, since the dials 271 may be selectively rotated in a clockwise additive direction (Fig. 13) or in a counter-clockwise subtractive direction, pin 282 becomes effective to cause either pawl 279 or pawl 278, respectively, to be moved to its inoperative position and either lug 284 or lug 285, respectively, also becomes effective, in cooperation with the spoke structure 288, to move the corresponding pawl to its inoperative position, as will be described hereinafter.

As stated above, each clutch control disk 275 of the product register 66 is provided with ten uniformly spaced-apart peripheral notches 276 instead of the single notch provided in each clutch control disk of the selection register 67. Each disk 275 and the associated dial 271 is normally locked in the "0" registering position of the dial, but may be locked in any one of the other nine positions thereof. For this purpose, a disk latch lever, generally indicated at 291, is pivotally mounted intermediate its length on a pin 292 on each separator plate 267. An upwardly extending offset arm 293 of lever 291 is provided at its end with a detent nose 294, selectively engageable in the notches 276 of the corresponding clutch control disk 275. The depending arm 295 of each lever 291 terminates in a tail portion 297 extending below the lower edge of the corresponding separator plate 267. Along its rearward edge and intermediate its length, the arm 295 is provided with a projection forming a shoulder 296 for a purpose to be described later. The nose 294 of lever 291 is normally urged by a spring 298 into engagement with a selected one of the notches 276 in the associated disk 275. A dial detenting member 300 is pivotally mounted adjacent lever 291 on the pin 292 and at its upper end, carries an angularly disposed detent nose 301 engageable in a dial notch 273 to releasably hold the associated dial 271 in the "0" registering position or any adjusted position thereof. Dial detent member 300 has a laterally projecting ear 303 overlying the forward edge of the arm 293 of lever 291, and is maintained in engagement with lever 291 by a spring 302. Thus, it can be seen that whenever lever 291 is rocked counter-clockwise to remove the nose 294 from engagement with a selected notch 276, the detent nose 301 of dial detent member 300 is also moved out of engagement with the corresponding dial notch 273.

Assuming that a dial 271 is rotating in an additive clockwise direction (Fig. 13) and the corresponding lever 291 and detent member 300 are rocked to the operative position thereof, the nose 294 of the lever 291 moves into a selected notch 276 in the corresponding disk 275. The adjacent peripheral tooth of the teeth formed between notches 276 engages with the nose 294 of the lever 291 terminating the rotation of the disk 275. After a further predetermined angular rotation of the associated dial 271, the nose 301 of the corresponding detent member 300 moves into engagement with the adjacent selected dial notch 273 to terminate the rotation of the dial in the proper value registering position. During the predetermined angular rotation of the dial 271 following the termination of the rotation of the associated disk 275, the pin 282 on the disk 275 becomes effective to cause the corresponding pawl 279 to be rocked out of engagement with the associated star wheel 277. Simultaneously therewith, the spoke structure 288 of the disk 275, engaging lug 284 of pawl 278, causes the pawl 278 to be rocked out of engagement also with the associated star wheel 277 so that shaft 90 and the star wheel may rotate independently of the corresponding dial 271. Similarly, if the dial 271 and associated disk 275 are rotating in a subtractive counter-clockwise direction (Fig. 13) and the corresponding lever 291 and detent member 300 are moved to operative positon, the nose 294 of the lever 291 is engaged by the adjacent peripheral tooth on disk 275, formed between notches 276, to terminate the rotation of the disk. During the further predetermined angular rotation of the dial 271 to the proper value registering position thereof, wherein the detent member 300 engages in the appropriate notch 273 of the dial, the pawl 278, in engagement with pin 282, is moved to its inoperative position relative to the associated star wheel 277 and the spoke structure 288 of the disk 275 becomes effective, by its engagement with lug 285, to move the corresponding pawl 279 to its inoperative position.

A tens-transfer lever, generally indicated at 305 (Figs. 8 and 16), is also pivotally mounted intermediate its length on pin 292 adjacent the side of the separator plate 267 opposite that on which the corresponding lever 291 and detent member 300 are mounted. The upwardly extending arm 306 of each lever 305 carries a pin 307 near its upper end, projecting laterally for cooperation with the dial 271 of the next lower order dial assembly. The depending arm 308 of each lever 305 is provided with a latching shoulder 310 intermediate its length and a tail portion 311 extending below the lower edge of the associated separator plate 267. Each dial assembly 91 includes a tens-transfer cam 312 of triangular shape mounted on, and projecting outwardly from, the pivotal mounting 281 of the associated clutch pawl 279. When an accumulator register dial 271 passes in either direction from "9" to "0" or "0" to "9," the tens-transfer cam 312 associated therewith engages the pin 307 of the tens-transfer lever 305 in the next higher order dial assembly 91 and rocks this lever in a counter-clockwise direction, as seen in Fig. 16. The upwardly extending offset arm 293 of disk latching lever 291 is provided with a projection 315 normally engaged with the leading edge 314 of arm 306 of the corresponding tens-transfer lever 305. Thus, when the tens-transfer lever 305 is rocked, as described above, the associated latching lever 291 and detenting member 300 are also rocked to release the corresponding clutch control disk 275 and dial 271. Lever 305 is normally urged to its inactive position by a spring 316 (Fig. 16), wherein the rearward edge of the arm 306 abuts the upwardly extended portion 270 of separator plate 267.

Means are provided for locking the tens-transfer lever 305 in its actively rocked position until after the tens-transfer has taken place in the corresponding order. For this purpose, a latching pawl 318 is pivotally mounted at 319 on separator plate 267 and, at its one end, is provided with a tooth 320 engageable with the latching shoulder 310 on the associated tens-transfer lever 305 to retain this lever in the position to which it is rocked by the tens-transfer cam 312 in the adjacent lower order dial assembly 91. A projection 321 on pawl 318 extends upwardly into a substantially triangular-shaped slot 335 (Figs. 15 and 16) broached in a shaft 334, journalled along its length in apertures 322 in the separator plates 267, and at its ends, in register end plates 84 and 85. The control of the pawl 318 by shaft 334 will be described later. Another projection 323 of each pawl 318 extends rearwardly and provides a shoulder 324 adapted for engagement by the toothed end 328 of a latch control lever 325 pivoted at 326 on the associated separator plate 267. Upon engagement of the toothed end 328 of lever 325 with shoulder 324, pawl 318 is held in its inoperative position with respect to the tens-transfer lever 305. A second arm 330 of latch control lever 325 lies in the same plane as the projection 323 of pawl 318 and is provided with a protuberance inserted in one end of a compression spring 332, the other end of which is held in place by a protuberance on the projection 323 of pawl 318. A third arm 331 of control member 325 extends downwardly below the associated separator plate 267 to control the engagement of the latch pawl 318 with the corresponding tens-transfer lever 305, presently to be described. The spring 332 serves two purposes, that of urging tooth 320 into engagement with shoulder 310 on lever 305, upon counter-clockwise rocking of latch control lever 325, and also that of urging the toothed end 328 of control lever 325 into engagement with shoulder 324 to latch pawl 318 in the inoperative position shown in Fig. 16.

Shaft 334 is provided also with a substantially triangular-shaped slot 336 broached therein, into which the shoulder extension 296 of each of the disk latching levers 291 projects, as seen in Fig. 16. Upon limited clockwise movement of shaft 334, the vertical shoulder of slot 335 releases those pawls 318 which are in latching engagement with the corresponding tens-transfer levers 305, whereupon the associated springs 332 become effective to cause relatching of these pawls 318 in their inactive position. This limited rocking movement of shaft 334 is not sufficient to engage the lower surface of the slot 336 with the shoulder extensions 296 of levers 291. However, if shaft 334 is rocked a greater extent in a clockwise direction (Figs. 15 and 16), the vertical shoulder of the slot 335 not only serves to release the actively positioned pawls 318, but the lower surface of slot 336 also serves to engage the shoulder extension 296, imparting a counter-clockwise rocking movement to disk latching levers 291, thereby freeing all clutch control disks 275 and dials 271 for a clearing, or zeroizing, operation of the accumulator register 66.

The rotation of each of the dials 271, which have been displaced from their "0" position during a registering operation, is terminated in the "0" position thereof during a clearing operation when shaft 90 and the dials 271 are rotated in an additive direction, or clockwise, as viewed in Fig. 15. For this purpose, a V-shaped "0" stop lever 338 is pivotally mounted at its apex at 339 on each register separator plate 267 and has diverging arms 340 and 341 extending upwardly therefrom. A terminal abutment 342 of each arm 340 is disposed within the area of the corresponding clutch control disk 275 and, upon counterclockwise movement from the inactive position shown in Fig. 15, is adapted for engagement by a "0" stop pin 344 on the corresponding clutch control disk 275. The arm 341 of each lever 338 extends upwardly beyond the area of the adjacent dial 271 and is provided at its end with a bifurcation 343 in engagement with a radial rib 346 extending longitudinally of a rockable bail 345 journalled at its ends in end plates 84 and 85. Normally, bail 345 retains all "0" stop levers 338 in the inoperative position shown in Fig. 15 so that the dials 271, which are free to rotate with shaft 90, may receive rotation in either direction. However, upon clockwise rocking movement of bail 345, the upper ends of all lever arms 340 are moved into the path of the corresponding "0" stop pins 344 so that, upon rotation of shaft 90 in an additive or clockwise direction during a register clearing operation, all of the dials 271 will be stopped in the "0" position if displaced therefrom.

*Register transfer mechanism*

A plurality of transfer bars 350 (Figs. 7 and 8) are disposed below the selection and product registers in parallel and ordinal spaced-apart relationship to each other and are slidably mounted in annular grooves in frame tie rods 32 and 34 for endwise movement. One such bar 350 is provided for each dial assembly 91. A series of spring fingers 351, of any suitable material such as beryllium copper, are secured at their lower ends to tie rod 35 and bear at their upper ends, one against the rearward end of each transfer bar 350, to resiliently urge these bars to a limited forward position. The transfer bars are preferably formed of flat metal strips set on edge, with the forward position of the bars being determined by the engagement of a lug 360, projecting laterally to the right and at right angles to each of the bars 350 intermediate the length thereof, with the flat on the rear face of tie rod 33.

A similar series of spring fingers 353 are mounted at their forward ends on the tie rod 32 and extend rearwardly therefrom. Lugs 352, projecting downwardly, one from the lower edge of each bar 350, are engaged by the rearward ends of the spring fingers 353 to releasably latch the bars in a rearwardly moved position thereof. The rearward ends of the spring fingers 353 are formed over the upper edge of the intermediate portion 161 of bail 160 in a manner such that, upon rearward movement of a bar 350, the corresponding spring 353 can move into latching position with respect thereto and also such that, upon clockwise rocking movement of bail 160, the active spring is immediately restored to its inactive position. Immediately following the release of a spring 353 from engagement with the lug on the corresponding bar 350, the spring 351 associated with the rearwardly moved bar 350 becomes effective to restore the bar to the normal position shown in Fig. 7. It will be recalled that bail 160 is rocked near the end of each cycle of machine operation. At its forward end, each transfer bar 350 carries a perpendicularly disposed ear 355 extending laterally at right angles to the bar. Following the step-by-step movement of the selection register 67 to the left, during entry of the selection value, the ears 355 of those bars 350 associated with the product register dial assemblies 91 and the corresponding actively positioned dial assemblies 193 of the selection register 67, will be positioned between the tail portion 238 of levers 236 and the tail portion 221 of the disk locking levers 214 in the corresponding orders of the selection register.

The transfer of a value from the selection register 67 into the accumulator register 66 is under the control of the transfer bars 350 ordinally aligned with the actively positioned dial assemblies 193 and corresponding dial assemblies 91, respectively, following a rocking movement of register 66 to its "readin" position and a rocking movement of the selection register 67 to its "readout"

position. The rocking of the selection register 67 to its "readout" position is under the control of either the addition key 80 or subtraction key 81 for an additive or subtractive registration in the accumulator register 66.

Referring now to Fig. 6, an arm 183 is pivotally mounted at 184 on the extended end 185 of lever 120 and carries a roller 186, at its upper end, engaged with a cam edge of the bail leg 180. A latch pawl 188 is pivoted at 365 on the rearward end of lever arm extension 185, and at its lower end, is provided with a notch which is normally urged clockwise by a spring 367 into engagement with the lower end of lever 183. In this normally latched position of lever 183, roller 186 is maintained in engagement with the cam edge on bail arm 180. As explained hereinbefore, a depression of either the addition key 80 or subtraction key 81 becomes effective, through a laterally extended pin 187 on lever 120, to rock the lever 120 counterclockwise, as viewed in Fig. 6. Through this rocking movement of lever 120, roller 186 imparts a rocking movement to guide rod 178 in a counterclockwise direction about the pivotal mountings 182 (Figs. 6 and 8), thereby rocking the selection register 67 to its "readout" position. Register 67 is returned to its initial position under the influence of spring 181 (Fig. 7) near the end of the "readout" cycle when bail 160 receives a clockwise rocking movement (Fig. 6). The intermediate portion 161 of bail 160 extends through an aperture in frame plate 27 and is provided with a depending arm 363 at its rightmost end formed at right angles thereto. A pin 364 on the lower end of arm 363 abuts the rearward edge of an extension of latch pawl 188, which pin 364 becomes effective, upon clockwise rocking movement of the bail 160, to rock the lower end of latching pawl 188 out of engagement with the end of the lever 183. Spring 181 thereafter restores selection register 67 to its normal position so that the value in the selection register is entered only once in the product, or accumulator register 66 with a single depression of the addition or subtraction key and irrespective of the fact that either key may be held depressed. Upon release of lever 183, roller 186 drops into engagement with a hook 366 secured at 182 on outboard frame plate 28. Upon release of the depressed addition or subtraction key 80 or 81, the lower end of lever 183 moves downwardly into position for re-engagement by the notch in the lower end of pawl 188 under the urgency of the spring 367.

Following the movement of the selection register 67 to its "readout" position by a depression of the addition key 80 or the subtraction key 81, as described above, and upon cyclic rotation of shaft 192, all of the actively positioned dials 198 which have been differentially adjusted to represent the digits of a selected value, will receive rotation in a clockwise direction as viewed in Fig. 8. As the selection register 67 is rocked to its "readout" position, the tails 238 of levers 236 are moved into engagement with the ears 355 on the corresponding transfer bars 350. Thereafter, as the adjusted register dials 198 rotate in a clockwise direction to their "0" position, the "0" cam 240 on each of the dials 198 becomes effective, upon passage of the dial from its "9" to "0" position, to rock the lever 236 in the adjacent higher order, thereby effecting a rearward movement of the transfer bar 350 associated with the adjacent lower order dial assembly 193. The angular rotation of each dial 198 to "0" will be the complement of the degree of adjustment of the dial upon registration of the digit thereon. For example, if the dial 198 is adjusted for a registration of "3," it will first be turned through seven angular increments to "0" when the lever 236 in the next higher order is rocked to impart a rearward movement to the bar 350 associated with the active order dial. Following the rearward movement of the bar 350, the dial 198 completes its cycle of rotation or turns another three angular increments. The number of angular increments of rotation of each dial 198 to the end of the cycle after passing the "0" position will be registered in the corresponding dial 271 of the product register 66. In the example given, a "3" would be registered in the dial 271.

Each of the registers 65 and 66 have a "readin" and a "readout" position, the "readin" position of the register 66 being shown in Fig. 7, while the "readout" position of the register is shown in Fig. 8. The rearward translation of the bars 350 will be ineffective to cause a transfer of the value in the selection register 67 into either of the registers 65 or 66 in the "readout" position of these registers. However, if either or both product registers 65 and 66 are selectively rocked to the "readin" position shown in Fig. 7, the value in the selection register may be transferred additively or subtractively into the "readin" positioned registers 65 and/or 66 in accordance with the control key 80 or 81 depressed. As stated hereinbefore, each of the end plates 70, 72 of the register 65 and end plates 84, 85 of the register 66 is provided with a boss serving as a journal for the respective register shafts 75 and 90. These bosses also serve as a pivotal support for each of the registers 65 and 66 in brackets 356 (Fig. 9) and brackets 389 (Fig. 19) secured on respective side plates 26 and 27. The rocking movement of each of the registers 65 and 66 about the rotational axes of the registers is under the control of similar control keys 357 (Figs. 4 and 9), the key 357 for register 66 being shown in detail in Fig. 9. At the left-hand end of register 66, shaft 90 and a pin 361 on end plate 84 are respectively engaged in elongated slots in the stem of the key 357. The pin 361 extends laterally from end plate 84 through an aperture in the upwardly extended support of bracket 356 and into the lower slot in the key stem 357 which is mounted adjacent the support bracket 356. At its lower end, the key stem 357 is provided with a substantially U-shaped aperture, either notch of which is resiliently urged by a spring 359 into engagement with a detent pin 358 on the bracket 356 to selectively retain the register 66 in either the "readout" position shown in phantom line or the "readin" position shown in full line in Fig. 9.

To transfer a value from the selection register 67 into either accumulator register, for example, register 66, key 357 is manipulated to rock the register 66 to its "readin" position before the addition key 80 or the subtraction key 81 is depressed to enable a transfer operation. It will be understood that registers 65 and 66 may be conditioned to receive the selection value simultaneously, if desired. Upon rocking of the register 66 to its "readin" position (Fig. 7), the tail portion 297 of the disk locking lever 291 of each dial assembly 91 of this register is moved into operative position relative to the laterally projecting lug 360 on the corresponding transfer bar 350. Thus, when the transfer bar 350 is moved rearwardly by the transfer control lever 236 in a higher order of the selection register, lever 291 of the product register dial assembly 91, corresponding to the adjacent lower order of the selection register, is rocked in a counterclockwise direction, as viewed in Fig. 15, to release the associated clutch control disk 275. It will be noted that the selection register dial assembly lever 236 is only momentarily rocked by the associated "0" cam 240 to move the corresponding transfer bar 350 rearwardly. However, the lug 352 on the transfer bar 350 is latched by the corresponding spring finger 353, so that the bar is held in its rearwardly moved position and the corresponding lever 291 is held disengaged from the associated clutch control disk 275. Upon release of the clutch control disks 275, the corresponding dials 271 will turn with shaft 90 in either direction, depending upon which key, 80 or 81, has been depressed. Near the end of the digitation cycle, bail 160 is rocked to release the rearward end of the associated springs 353 from the lugs 352 on the corresponding transfer bars 350, permitting the bars 350 to be moved forwardly to their inactive position under the influence of the springs 351. As the bars 350 return to their initial position, springs 298 restore the corresponding levers 291 to lock the associated disks 275 and therefore dials 271 in their adjusted position. The rocking of the bail 160 also effects a restoration of selection register 67 to its initial position, as explained above.

Under the conditions described supra, the value in the selection register 67 will be transferred into the selected product or accumulator register during the first of three successive operating cycles of the mechanism and the tens-transfers in the product register will be completed during the two succeeding operating cycles. In the mechanism illustrated, three successive operating cycles of the machine are provided by manually holding the addition or subtraction key depressed for the required time interval, but it is contemplated that this programming of the machine operation may be obtained by the provision of a simple form of automatic programming mechanism. Following the three cycles required to transfer the value from the selection register into the product register and to complete the tens-transfers in the product register, the "Clear" key 245 may be depressed to zeroize the selection register and effect its return to the terminal right-hand position in preparation for a new entry.

Tens-transfer operation in the product register

If, during the transfer of the value from the selection register 67 into an accumulator register, such as the register 66, a product, or accumulator, dial 271 is rotated in either direction from "9" to "0" or from "0" to "9," the "0" cam 312 (Figs. 14 and 16) on the dial will rock the tens-transfer lever 305 associated with the dial assembly of the next higher order. Rocking of the lever 305 will disengage the disk latching lever 291 in the same order, since the leading edge 314 of the lever 305 abuts the projection 315 of the associated lever 291. If the dial in the order in which the transfer is being made is not receiving a selection value digit at the time of the transfer, the dial will then be advanced one step in either the additive or subtractive direction when the lever 305 in that order is rocked. The locking lever 291 and dial detent 300, in the order in which the transfer is being made, immediately become effective to relatch the dial disk and dial following this increment of rotation. However, if the higher order dial is rotating at the time the adjacent lower order dial is passing from "9" to "0" or "0" to "9," the transfer bar 350, corresponding to the higher order dial, will be in its rearwardly moved position. In the "readin" position of the register 66 (Fig. 7), the arm 331 of the latching levers 325 abut a laterally extending ear 368 on the corresponding transfer bars 350 so that, upon rearward movement of a bar 350 the associated latch lever 325 is disabled. The associated latch pawl 318 is thereby released for engagement with the tens-transfer lever 305 of the corresponding order when rocked by the "0" cam 312 of the adjacent lower order. Therefore, if the dial is rotating in the higher order into which a tens-transfer is effected, the tens-transfer lever 305, disk locking lever 291 and dial detent arm 300 of the higher order will be latched in their rocked position and will remain in their latched condition after completion of the digitation cycle following the return of the corresponding transfer bar 350 to its inactive position.

Figure 18:
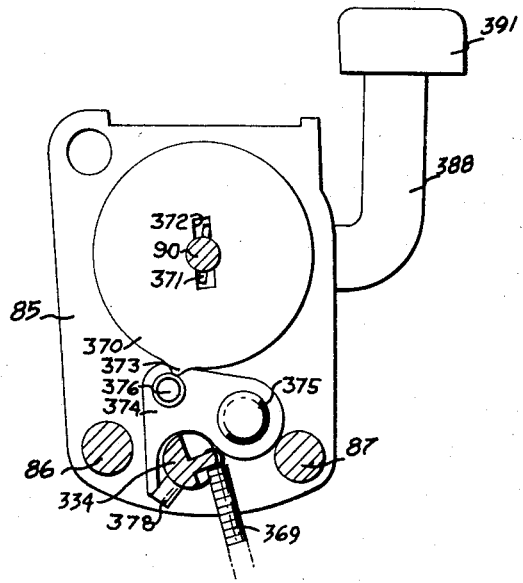
Fig. 18 is a view similar to Fig. 17, showing the illustrated parts in an operated condition.

Referring to Figs. 17 and 18, a cam 370 is mounted on the right-hand end of dial shaft 90 adjacent the inner surface of the register end plate 85, and has a loose driving connection with the shaft through a pin 371 extending diametrically through the shaft and received in a slot 372 in the cam, the slot being wider than the diameter of the pin. Cam 370 is generally circular in shape, having a single lobe 373 for cooperation with a roller 376 on an actuating lever 374 pivoted at 375 on end plate 85. Lever 374 is provided with a projection extending downwardly and engaged at its end with a pin 378 projecting radially from shaft 334. A spring 369, secured at its one end in the rib in shaft 334 and at its other end to the frame of the machine, serves to retain pin 378 in engagement with the projection on lever 374 and to maintain roller 376 in engagement with the peripheral edge of the cam 370. In approximately 18° after the beginning of the second cycle of machine operation, the lobe 373 on cam 370 rocks lever 374 counter-clockwise, as viewed in Fig. 18, to impart a limited counter-clockwise rocking movement to shaft 334.

Any delayed tens-transfer will be completed within the first increment of the ten angular increments of rotation of shaft 90 in the second cycle of machine operation. During this first increment of rotation in the second cycle, the counter-clockwise rocking movement of shaft 334, as viewed in Fig. 18, or clockwise, as viewed in Fig. 16, serves to release each of the pawls 318 from latching engagement with the associated levers 305 which were rocked during the digitation cycle. The levers 305, disk locking levers 291 and dial detent arms 300 will return to their latching positions with respect to the corresponding dials as soon as the delayed tens-transfers are completed. A tens-transfer made on a transfer, completed during the digitation cycle, will be completed in the same manner as a direct tens-transfer and a tens-transfer made on a delayed transfer, which is completed in the first increment of rotation of shaft 90 in the second cycle, will be completed during the second increment of rotation of the shaft in the same cycle.

In the case of a chain or wave transfer, the transfers are completed in the same manner as described above in connection with a tens-transfer into a stationary higher order dial. However, in the extreme condition, wherein all of the register dials 271 are standing at "9" and a "1" is added into the lowest, or units, order, the last rotational increment of the first, or digitation, cycle would turn the "9" in the units order to a "0" and would condition the tens-order for a transferred increment. Recalling that the addition key or subtraction key 80 or 81, respectively, is held depressed for three machine cycles of operation, shaft 90 will rotate continuously and during the second complete cycle of operation of the dial shaft 90, a transfer of "1" will be effected in the next ten higher order dials 271, while the transfer of "1" into the remaining nine order dials will be effected during the third cycle of operation. It will be remembered that the actively positioned transfer bar 350 is restored to its inactive forward position near the end of the first, or digitation, cycle so that the tens-transfers are effected in a direct transfer wave pattern in the second and third cycles during the continuous rotation of the shaft 90. Under other conditions, however, the wave could be completed in the first or in the second cycle. The rocking of shaft 334 at the beginning of the second and third cycles will not affect the tens-transfer operation since there are no delayed transfers in this chain transfer operation.

Product register clearing operation

Figure 19:
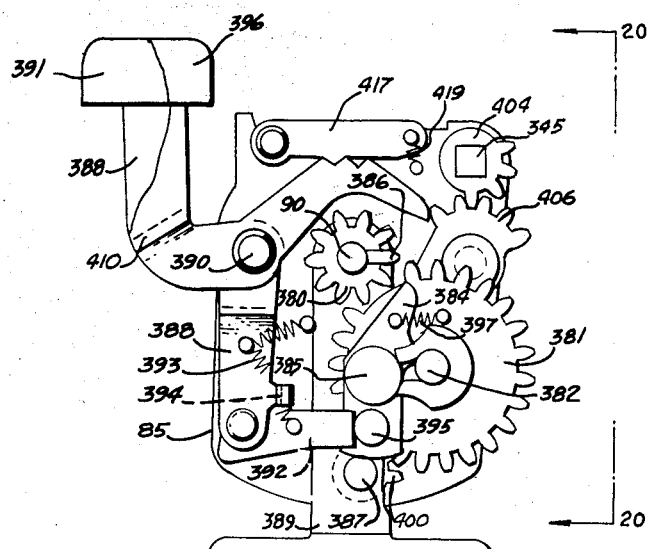
Fig. 19 is an elevational view of the product register clearing mechanism, the view being taken on line 19—19 in Fig. 1.
Figure 20:
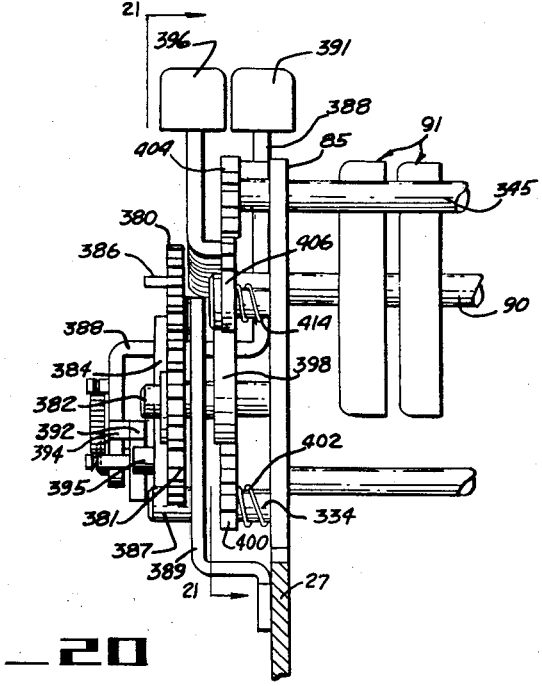
Fig. 20 is an elevational view of the product register clearing mechanism, taken on a plane indicated by line 20—20 in Fig. 19.

For a clearing operation, register 66 is rocked by lever 357 to its "readin" position. The addition key 80 is depressed and held for at least three cycles of the mechanism and a key 391 and an adjacent key 396 are simultaneously depressed (Figs. 19 and 20). An arm, or live tip, 392 is pivotally mounted on the lower end of key stem, or lever, 388 of key 391, pivoted intermediate its length at 390 on end plate 85. The arm 392 is normally maintained in a substantially horizontal position by a spring 393, urging the arm against a stop 394 provided on key stem 388 and formed inwardly at a right angle thereto.

Referring now to Figs. 19 and 20, a ten-tooth gear 380 is mounted on the right-hand end of dial shaft 90 in the same plane as a mutilated thirty-tooth gear 381 journalled on an arbor 382 carried by the end plate 85. Gear 381 has two adjacent teeth of its thirty teeth missing and in the normal, or full-cycle, position of gear 381 the gap so provided is disposed in a manner such that gear 380 will not mesh with gear 381 unless a clearing or interregister transfer operation is selectively established.

A pawl 384 is pivotally mounted intermediate its length at 385 on gear 381 and has one end normally disposed above the pivotal mounting and formed to provide an abutment for an elongated tooth 386 of the gear 380 when the pawl 384 is rocked in a counter-clockwise direction, as viewed in Fig. 19. The other, or arcual, end of pawl 384 is disposed below the pivotal mounting 385 and normally rests on a fixed stop pin 387 carried by supporting plate 389 spaced outwardly from, and secured on, end plate 85. The engagement of the arcual end of pawl 384 with pin 387 serves to retain gear 381 in its normal, or full-cycle, position.

Adjacent its lower end, pawl 384 carries a pin 395 normally urged by a spring 397 into engagement with the rearward end of arm 392. Thus, it can be seen, that upon depression of key 391, arm 392 is moved rearwardly, rocking pawl 384 counter-clockwise to move the arcual end of the pawl away from stop pin 387 and to position the upper end of the pawl in the path of the elongated tooth 386 of gear 380. As the mechanism cycles incident to depression of the addition key 80, dial shaft 90 rotates clockwise and the elongated or broad-faced tooth 386 of gear 380 strikes the upper end of pawl 384 and rotates gear 381 counter-clockwise sufficiently to bring the teeth thereof into mesh with the teeth of gear 380. The three cyclic rotations of gear 380 will thereafter impart one cycle of rotation to gear 381. Following the engagement of gear tooth 386 with pawl 384, spring 397 restores pawl 384 to its normal position abutting shaft 382. As gear 381 completes a single rotation, pin 395 engages the upper edge of arm 392 rocking the arm downwardly against the urgency of spring 393, and the lower end of pawl 384 strikes stop pin 387, terminating the rotation of the gear 381 in its original or full-cycle position. The gear 381 cannot then be rotated again without first returning the key 391 to its raised position thereby enabling the arm 392 to return to its normal position (Fig. 19) under the influence of spring 393.

During the first cycle of machine operation, dial shaft 90 is rotated independently of the dials 271, since they are held in their latched condition. However, near the end of this first cycle of operation, all of the disk latching levers 291 and dial detent arms 300 are released to enable rotation of all dials 271 in the second cycle of machine operation. For this purpose, a cam sector 398 (Figs. 21, 24 and 25) is secured on gear 381 for rotation therewith on arbor 382 and is provided at its leading end with a single tooth 399. A gear sector 400 is secured on the right-hand end of shaft 334, in the plane of cam 398, and has gear teeth 401 for cooperation with the single tooth 399 on cam sector 398. A torsion spring 402 (Fig. 22) is connected between gear sector 400 and register plate 85, resiliently urging the gear sector 400 and shaft 334 in a counter-clockwise direction to the normally inactive position of the shaft 334, as seen in Figs. 16, 17 and 20.

During the first cyclic rotation of gear 380 and the coincident one-third rotation of gear 381, the register dials 271 receive no rotation. However, near the end of the cycle, the tooth 399 of cam sector 398 meshes with the teeth 401 of sector gear 400 to rock gear 400 clockwise to the position shown in Fig. 24. With this rocking of gear sector 400 and shaft 334, the shoulder 336 of the shaft 334 engages the shoulder 296 of the levers 291, rocking these levers out of engagement with the corresponding clutch control disks 275 and the associated detent members 300 out of engagement with the corresponding dials 271, thereby permitting rotation of the dials (Fig. 15). During the second cyclic rotation of gear 380 and coincident one-third rotation of gear 381, gear sector 400 and shaft 334 are held in rocked position by the arcuate peripheral edge of cam 398 while the dials 271 receive a complete cycle of rotation. Near the end of the second cycle of rotation of gear 380 (Fig. 25), the cam sector 398 is moved from its engagement with gear sector 400 so that torsion spring 402 becomes effective to restore the gear sector 400 to its inactive position. The levers 291 and detent members 300 are thereafter restored to their disk and dial latching positions, respectively, under the influence of respective springs 298 and 302. During the third cyclic rotation of gear 380 and the last one-third rotation of gear 381, the parts are restored to their original positions.

During the second cyclic rotation of gear 380, the dials 271, which have been displaced from their "0" registering position, are restored in an additive or clockwise direction, as viewed in Fig. 15, to their "0" position, whereupon the disks 275 become latched to effect a disengagement of the clutches of the associated dials 271. A gear sector 404 (Figs. 21, 24 and 25) is mounted on the right-hand end of "0" stop lever bail 345 adjacent the outer surface of right-hand end plate 85 of the accumulator register 66. Gear sector 404 is provided with a series of teeth 405 enmeshed with the teeth 408 of a sector 406 pivotally mounted at 407 on accumulator register end plate 85. Gear sector 406 is provided with a radial projection 409, the end of which is normally engaged with the peripheral surface of the cam sector 398, as seen in Fig. 21.

A bellcrank lever 410 forming the key stem of key 396 is offset and is pivoted at 390, intermediate its length, on end plate 85. Key lever 410 is positioned adjacent key stem 388 so that keys 391 and 396 may be depressed simultaneously, if desired. The rearward terminal end 412 of key stem 410 normally abuts the leading surface of the leftmost tooth of the series of teeth 408 on cam sector 406 to hold the sector 406 against counter-clockwise rotation under the urgency of a torsion spring 414 (Figs. 20 and 23). Spring 414 surrounds pivot pin 407 and is secured at its one end to end plate 85 and at its other end to sector 406.

A pair of spaced-apart detent notches 415 and 416 are provided in the upper edge of the rearwardly extended end portion of key stem 410 for alternative engagement by a tooth on a detent arm 417 pivotally mounted at one end at 418 on end plate 85. At its other end, detent arm 417 supports one end of a spring 419 which is supported at its other end on a pin on end plate 85 and serves to resiliently maintain the tooth of detent arm 417 in either notch 415 or 416. The key stem, or lever, 410 is normally urged by a relatively light spring 420 to the position shown in Fig. 21, wherein the terminal end 412 thereof is in engagement with the leftmost tooth of the gear sector 406.

Upon depression of key 396, simultaneously with key 391, the terminal end 412 of key stem 410 is rocked out of the path of the teeth 408 and is resiliently detented in this position. The end of the projection 409 on sector 406 remains in engagement with the peripheral edge of the cam sector 398 during the first cycle of rotation of gear 380 and the coincident one-third cyclic rotation of gear 381. At, or near, the end of the first cycle of rotation of gear 380, the projection 409 of sector 406 rides off of cam 398 and the sector 406 rocks counter-clockwise under the influence of spring 414, rocking gear sector 404 and bail 345 in a clockwise direction, as viewed in Fig. 24. With the rocking of bail 345, it will be recalled that "0" stop levers 338 (Fig. 15) are moved into the path of the "0" stop pins 344 on the corresponding clutch control disks 275. During the second cycle of rotation of the gear 380 the pins 344 engage the levers 338 to terminate the rotation of the disks in the "0" positions of the associated dials. At the end of the second cycle of rotation of gear 380, cam 398 releases gear sector 400 and therefore shaft 334 to the influence of the torsion spring 402, thereby enabling the individual springs 298 and 302 to restore the corresponding disk latch levers 291 and detent arms 300, respectively, to their latching position with the associated dials in their "0" position. In the first part of the third cycle of rotation of gear 380 and coincident last one-third cycle of gear 381, the cam 398 becomes effective to engage the projection 409, thereby rocking sector 406 clockwise to restore sector 404 and bail 345 to their original or full-cycle position. The addition key 80 and transfer key 391 are now released and the "Clear" key 396 is manually raised by the operator to its original position, with the aid of spring 420, where it is detented by the detent arm 417.

The parts involved in the register clearing operation will now have been returned to their original positions and the mechanism stopped with the product register zeroized but still in its "readin" position so that a value in the selection register may be immediately transferred into the cleared product register, if desired.

*Interregister transfer operation*

When it is desired to make an interregister transfer from a selected product, or accumulator, register into the other accumulator register or the selection register, the register from which the value is to be read out is rocked to its "readout" position by manipulation of its key 357 (Fig. 1) which is detented in the "readout" position. If the register into which the value is to be transferred is the other accumulator register, it is rocked by its key 357 to "readin" position and is detented therein. It is to be noted that the selection register 67 must be restored to its inactive, or right-most, position before an interregister transfer is made from one product register to the other product register since the selection register is always rocked to its "readout" position upon depression of either the addition or subtraction key 80 or 81. However, if the selection register 67 is to be used to receive the transfer of a value, it must first be moved ordinally to the left the desired extent by operation of the "0" key 155 which is effective to engage the pin 128 on gear 127 with pawl 129 on helical shaft 69.

Assuming now, for example, that the accumulator register 66 is to be the "readout" register and the similar accumulator register 65 is to be the "readin" register and that the value in register 66 is to be additively registered in register 65, and assuming further that the value in register 66 is to be retained, i.e., the register will not be zeroized, register 66 will then be moved to its "readout" position by its key 357 and the key 357 associated with register 65 will be manually operated to move register 65 to its "readin" position. The "Transfer" key 391 and addition key 80 (Figs. 1, 6 and 19) are thereafter depressed simultaneously to initiate cyclic operation of the machine for three cycles of the mechanism. Near the end of the first cycle of rotation of gear 380, shaft 334 (Figs. 16, 19, 21, 24 and 25) is rocked clockwise by cam sector 398 and gear sector 400 to remove the disk stop levers 291 from latching engagement with the associated clutch control disks 275 and the dial detents 300 from engagement with the corresponding dials 271. During the second cyclic rotation of gear 380, the dials 271 of the "readout" register 66 rotate in a clockwise direction with dial shaft 90 and as each "0" cam 312 on a lower order dial 271 passes the pin 307 on the transfer lever 305 of the adjacent higher order dial assembly, a counter-clockwise rocking movement is imparted thereto. Referring now to Fig. 8, the ordinal transfer bars 350 are shown in their normal position, wherein the ear, or lug, 360 abuts the tie rod 33. In this position of the bars 350 and upon movement of the register 66 to its "readout" position, an ear 421 extending laterally to the left on each bar 350 extends into the path of, and is engaged by, the tail 311 of the tens-transfer lever 305 in the next higher order dial assembly of the associated register, as illustrated in Fig. 8. There are two sets of similar ears, or lugs, 360, 421 and 368 on each transfer bar 350, one set for each of the registers 65 and 66. As described above with reference to register 66, upon rocking movement of either register 65 or 66 to its "readin" position, the tails 297 of each disk locking lever 291 is in engagement with the laterally extended ear 360 (Fig. 7) of each corresponding transfer bar 350 and the ear 368 on the bar is in engagement with the arm 331 of each of the corresponding latch releasing levers 325. Thus, it becomes apparent that during the second cyclic rotation of gear 380 and shaft 90 and, upon passage of a dial 271 from "9" to "0" in the "readout" position of the register 66, the "0" cam 312 associated therewith rocks the tens-transfer lever 305 in the next higher order and the tail 311 thereof becomes effective, by its engagement with ear 421 on the transfer bar 350 associated with the adjacent lower order, to move the bar to its rearward position. Upon rearward movement of the bar 350, the ear 360, in engagement with the tail 297 of the disk locking lever 291 in the corresponding order of the "readin" positioned register 65, releases the locking lever 291 from its engagement with the corresponding disk 275. Simultaneously therewith, the ear 368 on this same bar 350 in engagement with the arm 331 of the latch releasing lever or pawl 325, rocks the lever 325 to its inactive position. Therefore, the remaining incremental angular rotation beyond "0" of this lower order dial in register 66 will also be effected in the now released corresponding ordinal dial in register 65. It will be recalled that near the end of each machine cycle of operation, bail 160 is rocked clockwise (Fig. 7) to effect restoration of each of the rearwardly moved transfer bars 350 to their normally inactive position, which restoration would become effective under the presently described condition at the end of the second cyclic rotation of the gear 380. Also, at the end of the second cyclic rotation of shaft 90 and gear 380, the shaft 334 is likewise returned to its normally inactive position.

It will be noted that none of the transfer levers 305 of the "readout" register 66 can be latched in position to set up a delayed tens-transfer, since the latch dogs 318 in the associated register are positively held in the inoperative position thereof by the clockwise rocking of shaft 334, as viewed in Fig. 16. The tens-transfer levers 305 of a lower order in the "readin" register 65 will, however, if rocked, be latched in the rocked position to set up a delayed tens-transfer in the next higher order dial which is rotating during the second cycle, or will effect an immediate tens-transfer to the next higher order dial if the dial is stationary. The third cyclic rotation of gear 380 and shaft 90 becomes effective, therefore, to restore the cam sector 398 to its full-cycle position and to effect a delayed increment transfer into the next higher order dial which may have been rotating at the time the transfer into that order was conditioned. Tens-transfers caused by tens-transfers would also be completed in the third cycle and if a tens-transfer wave were set up, it would normally be completed in the second and third cycles. For a full wave tens-transfer in twenty orders, one complete rotation is required. Thus, if all preliminary tens-transfers were completed during the second cycle of the three-cycle operation, a full wave tens-transfer could be completed during the third cycle. If it should be found, however, that under an extreme condition such as described hereinbefore, wherein all dials in the "readin" register are standing at "9," a full wave tens-transfer was not completed by the end of the third cycle, a fourth cycle could be utilized without any result other than to complete the tens-transfers, providing key 391 has been released and addition key 80 is held depressed. Under this condition, the gear 380 in the "readout" register will not impart any further rotation to gear 381.

It will be understood that a substractive interregister transfer may be effected from either accumulator register into the other accumulator register by a depression of the substraction key 81 simultaneously with that of key 391.

If the key 396 had been depressed simultaneously with the key 391 of the "readout" register, together with the addition key 80 at the beginning of the interregister transfer operation, the dials of the "readout" register 66 will have been stopped at the "0" position, as described under the clearing operation, instead of being turned to their original registration. Thus, the dials of the "readout" register 66 would be in their cleared, or zeroized, condition.

If the transfer is to be made from either accumulator register 65 or 66 into the selection register 67, the laterally formed ears 355 on the forward ends of the transfer bars 350 engaging the tail portions 221 (Fig. 8) of the dial clutch control levers 214 of the selection register, will rock these levers to dial releasing position so that the value in the "readout" register will be entered into the selection register.

The manner in which addition and subtraction, register clearing operations, and interregister transfer operations may be made, has been fully illustrated and described. It is contemplated that a calculating machine based on the above-described mechanism, would also be capable of division and multiplication operations and perhaps special operations for selected types of calculations. Since these additional operations can be performed with the register, dial clutch and clutch actuating mechanism, as hereinabove described and shown in the accompanying drawings, the present disclosure is considered entirely adequate for the purposes of the present application.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a calculating machine, an accumulator register comprising a register dial drive shaft and a series of register dial and clutch assemblies ordinally arranged along said drive shaft, selection mechanism comprising a selection register drive shaft and a series of dial and clutch assemblies ordinally arranged along said selection register drive shaft, keyboard means effective to actuate the selection register dial clutches successively from left to right, power means effective to impart successive operating cycles of rotation to said drive shafts, and ordinal transfer means extending between the selection register and the accumulator register and actuated by the clutch and dial assemblies of one of said registers to control the clutch and dial assemblies of the other of said registers to turn the dials of said other register to the same angular positions as the coordinal dials of said one register.

2. In a calculating machine, an accumulator register comprising a register dial drive shaft and a series of register dial and clutch assemblies ordinally arranged along said drive shaft, selection mechanism comprising a selection register drive shaft and a series of dial and clutch assemblies ordinally arranged along said selection register drive shaft, keyboard means effective to actuate the selection register dial clutches successively from left to right, power means effective to impart successive operating cycles of rotation to said drive shafts, ordinal means extending between the selection register dial and clutch assemblies and the accumulator register dial and clutch assemblies and actuated by the selection register dial assemblies to control the accumulator register dial clutches to turn the associated accumulator register dials to the same rotational positions as occupied by the selection register dials of corresponding orders, and manually operated control means effective to enable and disable said ordinal means and select the direction of rotation of said accumulator register dials.

3. In a calculating machine, an accumulator register comprising a register dial drive shaft and a series of register dial and clutch assemblies ordinally arranged along said drive shaft, means effective to move said accumulator register between a "readin" and a "readout" position, selection mechanism comprising a selection register drive shaft, a series of dial and clutch assemblies ordinally arranged along said selection register drive shaft, means effective to move said selection register between a "readin" and a "readout" position, keyboard means effective when said selection register is in "readin" position to actuate the selection register dial clutches successively from left to right, power means effective to impart successive operating cycles of rotation to said drive shafts, and transfer means extending between the selection register dial and clutch assemblies and the accumulator register dial and clutch assemblies and enabled when said accumulator register is in "readin" position and said selection register in "readout" position, to actuate the accumulator register dial clutches to turn the corresponding register dials to the same rotational positions as occupied by the selection register dials of corresponding orders.

4. In a calculating machine, an accumulator register comprising a dial drive shaft, a series of rotatable register dials ordinally arranged along said drive shaft, a clutch device associated with each register dial for selectively providing a driving connection between the drive shaft and the associated register dial, a selection register comprising a frame movable longitudinally of said accumulator register, a selection register dial drive shaft journalled in said frame, a series of rotatable selection register dials ordinally arranged along said selection register dial drive shaft, a clutch device associated with each selection register dial and effective to selectively provide a driving connection between the selection register dial drive shaft and the associated dial, power means drivingly connected to said drive shafts and effective to establish successive rotational cycles thereto, means operative in conjunction with said drive shafts to successively step said selection register from right to left and successively bring the selection register dial clutch devices to an actuating station, keyboard means effective to control said power means, to actuate the selection register dial clutch in actuating position in timed relationship to the rotation of said drive shafts to set up entry values in said selection register dials, and to effect operation of said stepping means, a plus and minus control key, and transfer means extending between the accumulator register dial clutch devices and the selection register dial clutch devices positioned to the left of said actuating station and rendered operable by said selection register dials upon operation of either of said control keys to actuate said accumulator register dial clutch devices in timed relationship to the operation of said selection register to effect the transfer of a value from said selection register into said accumulator register dials.

5. In a calculating machine, an accumulator register comprising a dial drive shaft, a series of rotatable register dials ordinally arranged along said drive shaft and a clutch device associated with each register dial for selectively providing a driving connection between the drive shaft and the associated register dial, selectively settable means effective to condition said accumulator register for a "readin" or "readout" operation, a selection register comprising a frame movable longitudinally of said accumulator register and adjustable from a normal "readin" position to a "readout" position, a selection register dial drive shaft journalled in said frame, a series of rotatable selection register dials ordinally arranged along said selection register dial drive shaft and a clutch device associated with each selection register dial and effective to selectively provide a driving connection between the selection register dial drive shaft and the associated dial, power means drivingly connected to said drive shafts and effective to establish successive rotational cycles thereto, means operative in conjunction with said drive shafts to successively step said selection register from right to left and successively bring the selection register dial clutch devices to an actuating station, keyboard means effective to control said power means, to enable operation of said stepping means, and to actuate the selection register dial clutch in actuating position in timed relationship to the rotation of said drive shafts to effect registration of a value in said selection register dials, manually operated means effective to adjust said selection register from the "readin" to the "readout" position and to initiate operation of said power means, and transfer means extending between the accumulator register dial clutch devices and the corresponding selection register dial clutch devices positioned to the left of said actuating station and enabled by said selection register dials in the "readout" position of said selection register to actuate said accumulator register dial clutch devices in timed relationship to the actuation of said selection register dials and in the "readin" condition of said accumulator register thereby effecting a value registration in said accumulator register in accordance with the value registration in said selection register.

6. In a calculating machine, an accumulator register comprising a dial drive shaft, a series of rotatable register dials ordinally arranged along said drive shaft, a clutch device associated with each register dial for selectively providing a driving connection between the drive shaft and the associated register dial, and tens-transfer means associated with each dial for effecting a tens-transfer from any lower order accumulator register dial to the dial of the next higher order, a selection register comprising a frame movable longitudinally of said accumulator register, a selection register dial drive shaft journaled in said frame, a series of rotatable selection register dials ordinally arranged along said selection register dial drive shaft and a clutch device asociated with each selection register dial and effective to selectively provide a driving connection between the selection register dial drive shaft and the associated dial, power means drivingly connected to said drive shafts and effective to establish successive rotational cycles thereto, means driven by said power means in synchronism with said drive shafts to ordinally step said selection register from right to left and successively bring the selection register dial clutch devices to an actuating station, keyboard means effective to control said power means, to enable said driven means, and to actuate each selection register dial clutch upon movement to the actuating station in timed relationship to the rotation of said drive shafts to effect registration of the digits of a value in said selection register dials, transfer means extending between the accumulator register dial clutch devices and the selection register dial clutch devices positioned to the left of said actuating station to control the engagement of said accumulator register clutch devices, and means associated with each selection register dial effective to control said transfer means to cause a value registered in said selection register dials to be registered in said accumulator register dials subsequent to the registration of the value in the selection register dials.

7. In a calculating machine, an accumulator register comprising a register dial drive shaft, a series of rotatable register dials ordinally aranged along said drive shaft and a clutch device associated with each dial for selectively providing a driving connection between the drive shaft and the associated dial, a selection register comprising a frame movable longitudinally of said accumulator register, a dial drive shaft journalled in said frame, a series of rotatable dials ordinally arranged along said selection register dial drive shaft and a clutch device associated with each selection register dial and effective to selectively provide a driving connection between the selection register dial drive shaft and the associated selection register dial, power-driven means for driving said drive shafts and effective to establish successive rotational cycles thereto, means engageable with said power-driven means for operation in synchronism with said drive shafts to ordinally step said selection register from an inactive to an active position and successively bring said selection register dial clutch devices to a predetermined actuating station, means associated with said stepping means operative upon operation of said stepping means to retain said selection register in the active position thereof, power means operable to restore said selection register to the inactive position thereof upon release of said retaining means, keyboard means effective to control said power-driven means, to effect engagement of said stepping means, and to actuate the selection register dial clutch in said predetermined actuating station in timed relationship to the coincidental rotation of said drive shafts to effect successive entry of the rigits of a value in said selection register dials, transfer means extending between the accumulator register dial clutch devices and the actively positioned selection register dial clutch devices to actuate said accumulator register dial clutch devices in timed relationship to the actuation of said selection register dials to effect registration of the value in said selection register dials in said accumulator register dials, means rendered operable by each selection register dial for actuating said transfer means, and manually operable means effective to release said retaining means and to enable the operation of said power means to return said selection register to its inactive position subsequent to the operation of said transfer means.

8. A calculating machine register comprising a frame having end plates and tie rods extending between and connected to said end plates, separator plates mounted on said tie rods between said end plates and disposed in uniformly spaced-apart and parallel relationship to each other, a dial shaft extending through said end plates and said separator plates and journalled in said end plates for rotation in either direction, hollow dials journalled on said dial shafts and disposed one between each two adjacent separator plates, star wheels fixed on said dial shaft and disposed one within each of said hollow dials, a pair of clutch jaws pivotally mounted in each hollow dial and resiliently biased toward engagement with the corresponding star wheel to provide a driving connection between the dial shaft and the corresponding dial, clutch control disks rotatably mounted on said dial shaft one adjacent each dial and connected to the corresponding clutch jaws to hold the jaws out of engagement with the associated star wheels when the disk is held against rotation and to free the clutch jaws for engagement with the associated star wheel when the disk is free to rotate, and disk stop levers pivotally mounted one on each of said separator plates and rockable into and out of engagement with the corresponding clutch control disks to alternatively hold the disks against rotational movement or free them for rotation with said dial shaft.

9. A calculating machine register comprising a frame having end plates and tie rods extending between and connected to said end plates, separator plates mounted on said tie rods between said end plates and disposed in uniformly spaced-apart and parallel relationship to each other, a dial shaft extending through said end plates and said separator plates and journalled for rotation in said end plates, hollow dials journalled on said dial shaft and disposed one between each two adjacent separator plates, star wheels fixed on said dial shaft and disposed one within each of said hollow dials, a pair of clutch jaws pivotally mounted in each hollow dial and resiliently biased toward engagement with the corresponding star wheel to provide a driving connection between the dial shaft and the corresponding dial, clutch control disks rotatably mounted on said dial shaft one adjacent each dial and connected to the corresponding clutch jaws to hold the jaws out of engagement with the associated star wheel when the disk is held against rotation and to free the clutch jaws for engagement with the associated star wheel when the disk is free to rotate, disk stop levers pivotally mounted one on each of said separator plates and rockable into and out of engagement with the corresponding clutch control disk to alternatively hold the disk against rotational movement or free it for rotation with said dial shaft, latch means effective to latch said disk stop levers in disk releasing position, a latch releasing means for releasing all disk stop levers that have been latched in disk releasing position, and manipulable means for effecting operation of said latch releasing means.

10. A calculating machine register comprising a frame having end plates and tie rods extending between and connected to said end plates, separator plates mounted on the rods between said end plates and disposed in uniformly spaced-apart and parallel relationship to each other, a dial shaft extending through said end plates and said separator plates and journalled in said end plates for rotation in either direction, hollow dials journalled on said dial shaft and disposed one between each two adjacent separator plates, star wheels fixed on said dial shaft and disposed one within each of said hollow dials, a pair of clutch jaws pivotally mounted in each hollow dial and resiliently biased toward engagement with the corresponding star wheel to provide a driving connection between the dial shaft and the corresponding dial, clutch control disks rotatably mounted on said dial shaft one adjacent each dial and connected to the corresponding clutch jaws to hold the jaws out of engagement with the associated star wheels when the disk is held against rotation and to free the clutch jaws for engagement with the associated star wheel when the disk is free to rotate, a disk stop lever rockably mounted adjacent each control disk to releasably hold the associated disk against rotation, a zero cam on each dial, and a tens-transfer lever pivotally mounted on each separator plate and engaging the disk stop lever of the corresponding dial to rock the disk stop lever to disk releasing position when the tens-transfer lever is rocked, each tens-transfer lever being rocked for a time interval of approximately one unit space of rotation of the associated dial by the zero cam on the dial of next lower order when such next lower order dial passes through its "0" position.

11. A calculating machine register comprising a frame having end plates and tie rods extending between and connected to said end plates, separator plates mounted on said tie rods between said end plates and disposed in uniformly spaced-apart and parallel relationship to each other, a dial shaft extending through said end plates and said separator plates and journalled in said end plates for rotation in either direction, hollow dials journalled on said dial shaft and disposed one between each two adjacent separator plates, star wheels fixed on said dial shaft and disposed one within each of said hollow dials, a pair of clutch jaws pivotally mounted in each hollow dial and resiliently biased toward engagement with the corresponding star wheel to provide a driving connection between the dial shaft and the corresponding dial, clutch control disks rotatably mounted on said dial shaft one adjacent each dial and connected to the corresponding clutch jaws to hold the jaws out of engagement with the associated star wheel when the disk is held against rotation and to free the clutch jaws for engagement with the associated star wheel when the disk is free to rotate, disk stop levers pivotally mounted one on each of said separator plates and rockable into and out of engagement with the corresponding clutch control disks to alternatively hold the disks against rotational movement or free them for rotation with said dial shaft, a zero cam on each dial, a tens-transfer lever pivotally mounted on each separator plate and engaging the disk stop lever of the corresponding dial to rock the disk holding lever to disk releasing position when the tens-transfer lever is rocked, each tens-transfer lever being rocked for a time interval of approximately one unit space of rotation of the associated dial by the zero cam on the dial of the next lower order when such next lower order dial passes through its "0" position, latch means mounted on each separator plate and rendered effective if the dial of the same order is rotating at the time the associated tens-transfer lever is rocked to latch the tens-transfer lever in position to hold the corresponding disk stop lever disengaged from the associated disk until the end of the current rotation of said dial shaft and for one unit angular space at the beginning of the succeeding shaft rotation, a rockable bail engageable with all of said latch means, and means actuated by said dial shaft to rock said bail to latch releasing position one unit angular space after the beginning of each dial shaft rotation.

12. A calculating machine register comprising a frame having end plates and tie rods extending between and connected to said end plates, separator plates mounted on said tie rods between said end plates and disposed in uniformly spaced-apart and parallel relationship to each other, a dial shaft extending through said end plates and said separator plates and journalled in said end plates for rotation in either direction, hollow dials journalled on said dial shaft and disposed one between each two adjacent separator plates, star wheels fixed on said dial shaft and disposed one within each of said hollow dials, a pair of clutch jaws pivotally mounted in each hollow dial and resiliently biased toward engagement with the corresponding star wheel to provide a driving connection between the dial shaft and the corresponding dial, clutch control disks rotatably mounted on said dial shaft one adjacent each dial and connected to the corresponding clutch jaws to hold the jaws out of engagement with the associated star wheel when the disk is held against rotation and to free the clutch jaws for engagement with the associated star wheel when the disk is free to rotate, disk stop levers pivotally mounted one on each of said separator plates and rockable into and out of engagement with the corresponding clutch control disks to alternatively hold the disks against rotational movement or free them for rotation with said dial shaft, a zero cam on each dial, a tens-transfer lever pivotally mounted on each separator plate and engaging the disk stop lever of the corresponding dial to rock the disk stop lever to disk releasing position when the tens-transfer lever is rocked, each tens-transfer lever being rocked for a time interval of approximately one unit space of rotation of the associated dial by the zero cam on the dial of next lower order when such next lower order dial passes through its "0" position, latch means mounted on each separator plate and rendered effective if the dial of the same order is rotating at the time the associated tens-transfer lever is rocked, to latch the tens-transfer lever in position to hold the corresponding disk stop lever disengaged from the associated disk until the end of the current rotation of said dial shaft and one unit angular space at the beginning of the succeeding shaft rotation, a rockable bail engageable with all of said latch means, means actuated by said dial shaft to rock said bail to latch releasing position one unit angular space after the beginning of each dial shaft rotation, a zero stop stud on each clutch control disk, a zero stop lever pivotally mounted on each separator plate and rockable into and out of the path of the zero stop stud on the corresponding clutch control disk, a second rockable bail engaging said zero stop levers to rock them into and out of the paths of said zero stop studs, means on said disk stop levers engageable by the first-mentioned bail to rock said levers to disk releasing position, and manually actuated register clearing mechanism mounted on said frame and effective to rock said bails during rotation of said dial shaft to release said dials for rotation with said shaft, to stop all of said dials in their "0" positions, to re-engage said disk stop levers with the associated disks, and to rock said zero stop levers out of the paths of said zero stop studs.

13. In calculating machine mechanism, an accumulator register having a dial shaft, dials journalled on said shaft, clutch units adapted to individually provide driving connections between said shaft and said dials, and clutch control levers individually controlling the clutches of said accumulator register, a selection register including a dial shaft, dials journalled on said shaft, clutch units adapted to individually provide driving connections between said shaft and said dials, and clutch controlling levers individually controlling the clutches of said selection register, a keyboard, mechanism controlled by said keyboard and actuating said selection register clutch control levers to enter selected values from said keyboard into said selection register, transfer mechanism actuated by said selection register and actuating said accumulator register clutch control levers to transfer a value from said selection register into said accumulator register, and addition and subtraction control mechanism operative to establish a driving operation of said registers to effect a value transfer from said selection register into said accumulator register.

14. In calculating machine mechanism, an accumulator register having a dial shaft, dials journalled on said shaft, clutch units adapted to individually provide driving connections between said shaft and said dials, and clutch control levers individually controlling the clutches of said accumulator register, a selection register including a dial shaft, dials journalled on said shaft, clutch units adapted to individually provide driving connections between said shaft and said dials, and clutch controlling levers individually controlling the clutches of said selection register, a keyboard, mechanism controlled by said keyboard and actuating said selection register clutch controlling levers to enter selected values from said keyboard into said selection register, transfer mechanism actuated by said selection register and actuating said accumulator register clutch control levers to transfer a value from said selection register into said accumulator register, and addition and subtraction control mechanisms operative to establish a driving operation of said registers to effect a value transfer from said selection register into said accumulator register, said transfer mechanism including longitudinally slidable transfer bars movable in one direction by said selection register and resiliently urged in the opposite direction, means latching said transfer bars in the position to which they are moved by said selection register, and means releasing said transfer bars at the end of each rotation of said dial shafts.

15. In calculating machine mechanism, at least one accumulator register movable to a "readin" and a "readout" position and including a bidirectionally rotatable dial shaft and dial assemblies mounted in ordinal arrangement on said shaft and each including a dial, a dial clutch, clutch control means and tens-transfer means, a selection register movable from a "readin" to a "readout" position and including a rotatable dial shaft and dial assemblies mounted in ordinal arrangement on said shaft and each including a dial, a dial clutch, selection register dial clutch controlling means and dial "readout" means, a power unit, means including a cyclically operable clutch and a reversing clutch for said accumulator register dial shaft drivingly connecting said power unit to said respective dial shafts for cycling said selection register dial shaft and selectively cycling said accumulator register dial shaft in either an additive or a subtractive direction, a keyboard, actuating mechanism actuated by said keyboard to control said cyclically operable clutch and said selection dial clutch controlling means establishing a single cycle of operation to said dial shafts to effect entry of a selected digit from said keyboard into the appropriate dial of said selection register each time a keyboard key is depressed, means effective to move said accumulator register between the "readin" and "readout" position, addition and subtraction control means effective to move said selection register from "readin" to "readout" position, initiate operation of said cyclically operable clutch and to selectively control said reversing clutch, and transfer mechanism actuated by the "readout" means of said selection register to enable the dial clutch control means of said accumulator register to transfer a value either additively or subtractively from said selection register into said accumulator register when said dial shafts are cycled with said selection register in "readout" position and said accumulator register in "readin" position.

16. In a calculating machine, registers including a selection register and a plurality of accumulator registers each having a rotatable dial shaft and dial assemblies mounted in ordinal arrangement on said shaft and each assembly including a dial, a dial clutch, clutch control means and tens-transfer means, said selection register having a "readin" and "readout" position and including a rotatable dial shaft and dial assemblies mounted in ordinal arrangement on said shaft and each assembly including a dial, a dial clutch, clutch controlling means and dial "readout" means, a power unit, means including a cyclic clutch drivingly connecting said power unit to said dial shafts, a reversing clutch interposed between said cyclic clutch and said accumulator register dial shafts to selectively drive the dial shafts in either an additive or a subtractive direction, a keyboard, mechanism actuated by said keyboard to enable the said clutch controlling means and initiate operation of said cyclic clutch to establish a cycle of operation of said dial shafts to effect entry of a selected digit from said keyboard into the appropriate dial of said selection register each time a keyboard key is depressed, selective means effective to move said accumulator registers between a "readin" and a "readout" position, addition and subtraction control means effective to move said selection register from the "readin" to the "readout" position to initiate operation of said cyclic clutch and to control the engagement of said reversing clutch, transfer mechanism actuated by the "readout" means of said selection register to enable the dial clutch control means of a selected one of said accumulator registers to transfer a value either additively or subtractively from said selection register into said accumulator register when said dial shafts are cycled with said selection register in the "readout" position and said accumulator register in the "readin" position, means selectively operable to terminate the rotation of said selection register dials in their "0" position, and manually operable means for enabling said terminating means and initiating operation of said cyclic clutch.

17. In a calculating machine, an accumulator comprising a register dial drive shaft, a series of rotatable register dials ordinally arranged along said drive shaft, a clutch device associated with each dial for selectively providing a driving connection between the drive shaft and the associated dial, a selection register comprising a frame movable longitudinally of said accumulator register, a dial drive shaft journalled in said frame, a series of rotatable dials ordinally arranged along said selection register dial drive shaft, a clutch device associated with each selection register dial and effective to selectively provide a driving connection between the selection register dial drive shaft and the associated selection register dials, power means drivingly connected to said drive shafts and effective to establish successive rotational cycles thereto, means operative in conjunction with said drive shafts to ordinally step said selection register from an inactive to an active position and successively bring said selection register dial clutch devices to a predetermined actuating station, keyboard means effective to control said power means and actuate the selection register dial clutch in said predetermined actuating station in timed relationship to the coincidental rotation of said drive shafts to set up entry values in said selection register dials, a control key, transfer means extending between the accumulator register dial clutch devices and the selection register dial clutch devices in the active position of said selection register and operated by said selection register dials upon manipulation of said control key to enable said accumulator register dial clutch devices in timed relationship to effect the transfer of a value from said selection register dials into said accumulator register dials, and manually controlled means effective to zeroize said selection register dials and to return said selection register from the active to the inactive position thereof subsequent to the operation of said control key.

18. In a calculating machine, an accumulator register comprising a register dial drive shaft and a series of register dial clutch assemblies ordinally arranged along said drive shaft, selection mechanism comprising a selection register dial drive shaft and a series of dial clutch assemblies ordinally arranged along said selection register drive shaft, keyboard means effective to actuate the selection register dial clutches successively from left to right, power means effective to impart successive operating cycles of rotation to said drive shafts, and transfer means actuated by the selection register dial clutch assemblies and effective to control the accumulator register dial clutch assemblies to turn the accumulator register dials to the same rotational positions as occupied by the selection register dials of corresponding orders.

19. In a calculating machine, a first register comprising an ordinal series of dial and clutch assemblies, a drive shaft for said assemblies, a second register comprising an ordinal series of dial and clutch assemblies, a drive shaft for the assemblies of said second register, power means effective to impart successive operating cycles of rotation to said drive shafts, and transfer means extending between the first register dial and clutch assemblies and the second register dial and clutch assemblies and actuated by the dial and clutch assemblies of one of said registers to control the dial and clutch assemblies of the other of said registers to turn the dials of said other register to the same rotational positions as occupied by the dials of corresponding orders of said one register.

References Cited in the file of this patent

UNITED STATES PATENTS

| Number | Name | Date |
|---|---|---|
| 368,528 | Grant | Aug. 16, 1887 |
| 2,224,770 | Mills | Dec. 10, 1940 |
| 2,328,653 | Lake et al. | Sept. 7, 1943 |
| 2,387,870 | Avery | Oct. 30, 1945 |
| 2,416,369 | Avery | Feb. 25, 1947 |
| 2,424,322 | Luhn | July 22, 1947 |

UNITED STATES PATENT OFFICE
CERTIFICATE OF CORRECTION

Patent No. 2,922,574                              January 26, 1960

Morton P. Matthew

It is hereby certified that error appears in the printed specification of the above numbered patent requiring correction and that the said Letters Patent should read as corrected below.

Column 1, line 65, for "ten-transfer" read -- tens-transfer --; column 3, line 68, for "idlers" read -- idler --; column 5, line 4, for "wil" read -- will --; line 7, for "operatble" read -- operable --; column 11, line 2, after "with" insert -- the --; column 12, line 55, for "differently" read -- differentially --; line 57, for "rotationu" read -- rotation --; line 63, for "267" read -- 67 --; column 13, line 19, for "opposition" read -- opposite --; column 16, line 38, for "positon" read -- position --; column 26, line 68, for "substractive" read -- subtractive --; line 71, for "substraction" read -- subtraction --; column 29, line 34, for "journaled" read -- journalled --; column 30, line 16, for "rigits" read -- digits --; line 38, for "shafts" read -- shaft --; same column 30, line 59, and column 31, line 14, for "the rods", each occurrence, read -- tie rods --.

Signed and sealed this 27th day of September 1960.

(SEAL)
Attest:

KARL H. AXLINE                                    ROBERT C. WATSON
Attesting Officer                                Commissioner of Patents